(12) United States Patent
Hongo

(10) Patent No.: US 12,533,659 B2
(45) Date of Patent: Jan. 27, 2026

(54) METHOD OF PRODUCING CATALYST-BEARING SUPPORT AND METHOD OF PRODUCING FIBROUS CARBON NANOSTRUCTURE

(71) Applicant: ZEON CORPORATION, Tokyo (JP)

(72) Inventor: Takayoshi Hongo, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 577 days.

(21) Appl. No.: 17/753,832

(22) PCT Filed: Sep. 24, 2020

(86) PCT No.: PCT/JP2020/036140
§ 371 (c)(1),
(2) Date: Mar. 16, 2022

(87) PCT Pub. No.: WO2021/060419
PCT Pub. Date: Apr. 1, 2021

(65) Prior Publication Data
US 2022/0331777 A1    Oct. 20, 2022

(30) Foreign Application Priority Data
Sep. 27, 2019    (JP) .................................. 2019-177866

(51) Int. Cl.
*B01J 21/04*    (2006.01)
*B01J 21/06*    (2006.01)
(Continued)

(52) U.S. Cl.
CPC ............. *B01J 21/04* (2013.01); *B01J 21/066* (2013.01); *B01J 23/745* (2013.01);
(Continued)

(58) Field of Classification Search
CPC ...... B01J 21/04; B01J 21/066; B01J 37/0223; B01J 23/745; B01J 37/0215;
(Continued)

(56) References Cited

U.S. PATENT DOCUMENTS 4,305,843 A     12/1981   Krabetz et al.
2006/0104887 A1*  5/2006  Fujioka .................. B82Y 30/00
                                              422/150
(Continued)

FOREIGN PATENT DOCUMENTS

CN    1913978 A    2/2007
EP    1733801 B1   9/2010
(Continued)

OTHER PUBLICATIONS https://www.electronics.toray/en/products/torayceram/tor_01.html (Year: 2025).*

(Continued)

*Primary Examiner* — Daniel Berns
*Assistant Examiner* — Joshua Maxwell Speer
(74) *Attorney, Agent, or Firm* — KENJA IP LAW PC

(57) ABSTRACT

Provided is a method of producing a catalyst-bearing support that produces a catalyst-bearing support used in production of a fibrous carbon nanostructure. The production method includes: a stirring step of rotating an approximately circular tube-shaped rotary drum around a central axis so as to stir a particulate support; a spraying step of spraying a catalyst solution against the particulate support inside of the rotary drum; and a drying step causing a drying gas to flow to inside of the rotary drum from outside of the rotary drum so as to dry catalyst solution attached to the particulate support. In this production method, at least part of an (Continued)

implementation period of the stirring step and at least part of an implementation period of the spraying step overlap with each other.

10 Claims, 9 Drawing Sheets

(51) Int. Cl.
*B01J 23/745* (2006.01)
*B01J 37/02* (2006.01)
*C01B 32/162* (2017.01)

(52) U.S. Cl.
CPC ....... *B01J 37/0215* (2013.01); *B01J 37/0236* (2013.01); *C01B 32/162* (2017.08)

(58) Field of Classification Search
CPC . B01J 37/0236; B01J 2/006; B01J 2/12; B01J 2/14; B01J 23/002; B01J 37/0221; B01J 37/0228; B01J 37/08; B01J 37/082; C01B 32/162; D01F 9/127; D01F 9/1273
See application file for complete search history.

(56) References Cited

U.S. PATENT DOCUMENTS

| | | |
|---|---|---|
| 2008/0271668 A1 | 11/2008 | Hasegawa et al. |
| 2009/0087372 A1 | 4/2009 | Buchholz et al. |
| 2012/0219490 A1 | 8/2012 | Noda et al. |
| 2012/0321543 A1 | 12/2012 | Miyamoto et al. |
| 2013/0287674 A1 | 10/2013 | Haba et al. |

FOREIGN PATENT DOCUMENTS

| | | | | |
|---|---|---|---|---|
| EP | 2420317 A1 | * | 2/2012 | ............ B01J 35/397 |
| JP | S5343475 B2 | | 11/1978 | |
| JP | H1076152 A | | 3/1998 | |
| JP | 2004076197 A | | 3/2004 | |
| JP | 2004238261 A | | 8/2004 | |
| JP | 2005296777 A | * | 10/2005 | ......... B05B 13/0257 |
| JP | 2012052282 A | | 3/2012 | |
| WO | 2011030821 A1 | | 3/2011 | |
| WO | 2012057229 A1 | | 5/2012 | |

OTHER PUBLICATIONS

Translation of EP 2420317 (Year: 2012).*
Translation of JP 2005 296777 (Year: 2005).*
Sep. 28, 2023, the Extended European Search Report issued by the European Patent Office in the corresponding European Patent Application No. 20868289.8.
Nov. 24, 2020, International Search Report issued in the International Patent Application No. PCT/JP2020/036140.
Riichiro Saito et al., Basics and Applications of Carbon Nanotubes, 2004, pp. 30-35, BAIFUKAN with a partial English translation.
Sumio Iijima, Helical microtubules of graphitic carbon, Nature, 1991, pp. 56-58, vol. 354.
Mar. 15, 2022, International Preliminary Report on Patentability issued in the International Patent Application No. PCT/JP2020/036140.

* cited by examiner

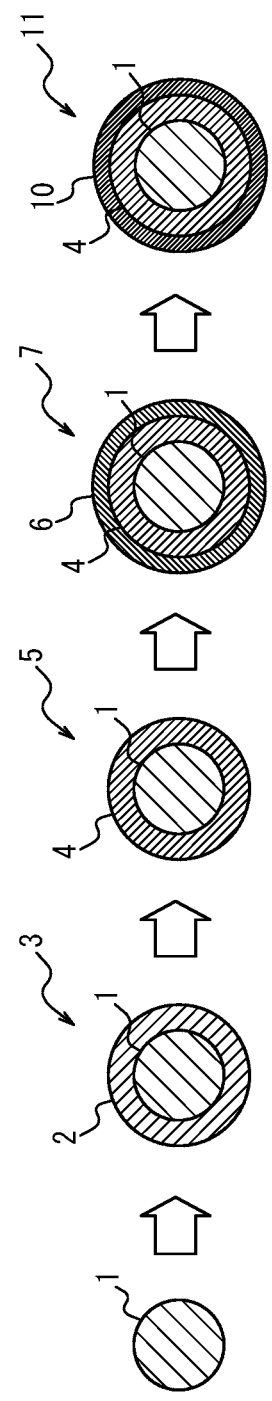

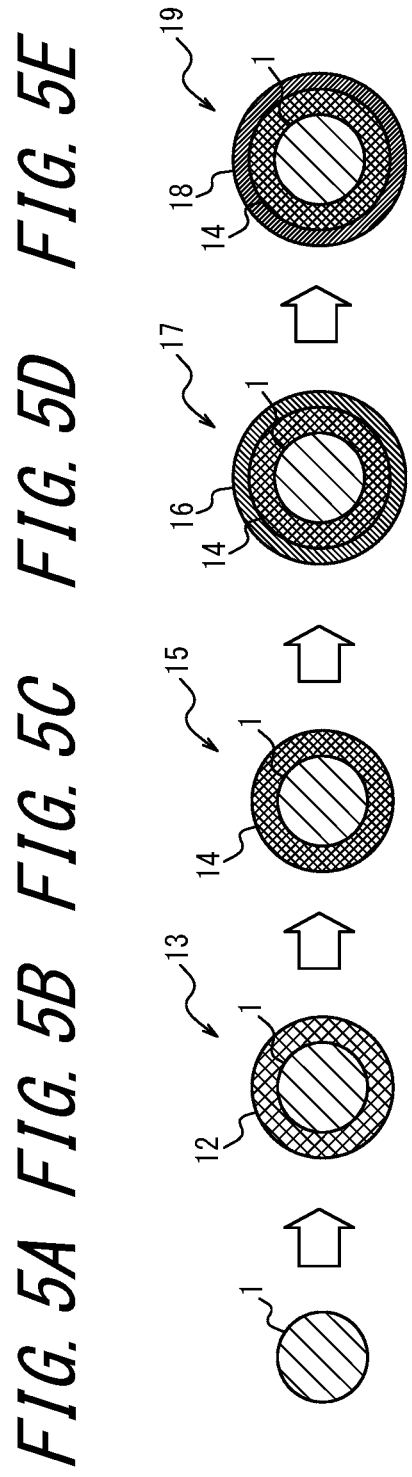

METHOD OF PRODUCING CATALYST-BEARING SUPPORT AND METHOD OF PRODUCING FIBROUS CARBON NANOSTRUCTURE

TECHNICAL FIELD

The present disclosure relates to a method of producing a catalyst-bearing support and a method of producing a fibrous carbon nanostructure.

BACKGROUND

Fibrous carbon nanostructures such as carbon nanotubes (hereinafter, also referred to as "CNTs"; for example, refer to Non-Patent Literature (NPL) 1) excel in terms of various characteristics such as mechanical strength, sliding characteristics, flexibility, semiconductor and metal electrical conductivity, and thermal conductivity, as well as having high chemical stability, and thus the adoption thereof in a wide range of applications has been progressing.

In recent years, studies have been made in relation to methods for efficient and low-cost production of fibrous carbon nanostructures having such excellent characteristics.

Examples of methods that have been reported for production of carbon nanotubes include arc discharge, laser ablation, and chemical vapor deposition (CVD). Of these methods, CVD has been widely studied as a production method that is suitable for large scale synthesis, continuous synthesis, and high-purity synthesis of single-walled carbon nanotubes excelling in terms of the aforementioned characteristics (for example, refer to NPL 2).

For example, Patent Literature (PTL) 1 discloses a technique of causing a source gas formed of acetylene, carbon dioxide, and an inert gas to flow at a specific partial pressure with respect to the surface of a support substrate loaded with a catalyst including Fe or the like so as to synthesize carbon nanotubes on the support substrate.

Moreover, PTL 2 discloses a fluidized bed reaction method in which a catalyst layer is formed on the surface of a particulate support inside of the main body of a fluidized bed-type or kiln-type mounting tank and then the particulate support with the catalyst layer formed on the surface thereof is used to perform a growth reaction of carbon nanofibers.

CITATION LIST

Patent Literature

PTL 1: WO2012/057229A1
PTL 2: JP2004-238261A

Non-Patent Literature

NPL 1: S. Iijima, Nature 354, 56 (1991)
NPL 2: Edited by Riichiro Saito and Hisanori Shinohara, "Basics and applications of carbon nanotubes", pp. 33-34, Baifukan, 2004

SUMMARY

Technical Problem

Examples of methods for producing a catalyst-bearing support that has a catalyst layer formed on the surface of a particulate support include a dry method in which a source gas of a catalyst is blown against the surface of the particulate support and a wet method in which a catalyst solution is applied onto the surface of the particulate support, but the wet method is superior to the dry method in terms that it enables more uniform formation of a catalyst layer.

However, a conventional method of producing a catalyst-bearing support suffers from problems that uniform formation of a catalyst layer becomes more difficult with decreasing size of the particulate support and that carbon nanotubes cannot necessarily be efficiently produced.

Examples of wet methods include an immersion method in which a particulate support is immersed in a catalyst solution. However, there are instances in which it is not possible to uniformly form a catalyst layer on the surface of a particulate support in this immersion method because liquid bridging between support particles and adhesion of support particles to one another may occur.

Consequently, there is demand for a method of producing a catalyst-bearing support that enables uniform formation of a catalyst layer on the surface of a particulate support.

Solution to Problem

The inventor conducted diligent studies with the aim of achieving the object described above.

The inventor discovered that by rotating a rotary drum housing a particulate support inside thereof so as to stir and fluidize the particulate support and by spraying a catalyst solution against the flowing particulate support while causing a drying gas to flow toward the inside of the rotary drum so as to dry catalyst solution attached to the surface of the particulate support and thereby form a catalyst coating film, it is possible to inhibit attachment of the particulate support to an inner wall surface of the rotary drum and attachment of support particles to one another, and it is also possible to uniformly form a catalyst layer on the surface of the particulate support. In this manner, the inventor completed the present disclosure.

Specifically, the present disclosure aims to advantageously solve the problem set forth above, and a presently disclosed method of producing a catalyst-bearing support is a method of producing a catalyst-bearing support that produces a catalyst-bearing support used in production of a fibrous carbon nanostructure, comprising: a stirring step of rotating an approximately circular tube-shaped rotary drum housing a particulate support inside thereof around a central axis that forms an angle of not less than 0° and less than 90° relative to a horizontal direction so as to stir the particulate support; a spraying step of spraying a catalyst solution against the particulate support inside of the rotary drum; and a drying step of causing a drying gas to flow to inside of the rotary drum from outside of the rotary drum and causing contact of the drying gas with the particulate support that has been sprayed with the catalyst solution in the spraying step so as to dry the catalyst solution, wherein at least part of an implementation period of the stirring step and at least part of an implementation period of the spraying step overlap with each other. By rotating a rotary drum housing a particulate support inside thereof around a central axis forming a specific angle relative to a horizontal line so as to stir the particulate support, by spraying a catalyst solution against the stirred particulate support, and by drying the particulate support that has been sprayed with the catalyst solution by causing a drying gas to flow to inside of the rotary drum in this manner, it is possible to obtain a catalyst-bearing support having a catalyst layer uniformly formed on the surface of a particulate support.

Since the particulate support can be caused to flow upward and downward in the direction of gravity (vertical direction) through mechanical rotation of the rotary drum in the presently disclosed method, even a particulate support having a large particle diameter can be used as a subject of the presently disclosed method because there is no need to cause suspension of the particulate support as is the case with a conventional fluidized bed method, for example.

Moreover, since the stirring step that is accompanied by rotation of the rotary drum and the drying step that is accompanied by inflow of the drying gas to inside of the rotary drum are implemented as steps that are independent of each other in the presently disclosed method, it is possible to separately adjust various conditions in these steps, which makes it possible to form a catalyst layer under more suitable conditions, thereby enabling more uniform formation of a catalyst layer.

Note that the surface of the particulate support may or may not have a catalyst layer formed thereat. In other words, the resultant catalyst-bearing support may include a plurality of catalyst layers or may include just one catalyst layer.

Also note that the phrase "approximately circular tube-shaped" as used in the present specification not only refers to a shape including a tube shape having a circular cross-section in at least part thereof, but also refers to a shape including a polygonal prism shape in at least part thereof and also to a shape including a circular or polygonal truncated pyramid shape in at least part thereof.

In the presently disclosed method of producing a catalyst-bearing support, a spraying direction of the catalyst solution and an inflow direction of the drying gas inside of the rotary drum preferably form an angle of not less than 0° and not more than 45°. When the spraying direction of the catalyst solution and the inflow direction of the drying gas inside of the rotary drum form an angle of not less than 0° and not more than 45°, it is possible to efficiently spray the catalyst solution against the particulate support and also to efficiently dry the particulate support that has been sprayed with the catalyst solution.

In the presently disclosed method of producing a catalyst-bearing support, at least part of the implementation period of the stirring step, at least part of the implementation period of the spraying step, and at least part of an implementation period of the drying step preferably overlap with one another. By adopting this configuration, throughput improves, and a catalyst-bearing support having a catalyst layer uniformly formed on the surface of a particulate support is efficiently obtained.

In the presently disclosed method of producing a catalyst-bearing support, the drying gas preferably flows in while in a temperature adjusted state of not lower than 0° C. and not higher than 200° C. in the drying step. By causing the drying gas to flow in while in a temperature adjusted state of not lower than 0° C. and not higher than 200° C. in the drying step, the particulate support that has been sprayed with the catalyst solution is efficiently dried, and a catalyst-bearing support having a catalyst layer more uniformly formed on the surface of a particulate support is obtained. In a case in which the drying gas flows in while in a temperature adjusted state of not lower than 0° C. and not higher than 200° C. in the drying step, this means that the particulate support is in a temperature adjusted and fluidized state, and thus the catalyst solution is quickly dried, cissing is inhibited, and a catalyst-bearing support having a catalyst layer more uniformly formed on the surface of a particulate support is obtained even when the sprayed catalyst solution has a high surface tension.

In the presently disclosed method of producing a catalyst-bearing support, the axis may form an angle of not less than 0° and not more than 20° relative to a horizontal direction. When the central axis forms an angle of not less than 0° and not more than 20° relative to a horizontal direction, the particulate support inside of the rotary drum can be efficiently caused to flow upward and downward in the direction of gravity (vertical direction).

In the presently disclosed method of producing a catalyst-bearing support, it is preferable that, in the drying step, an inflow port for causing the drying gas to flow to inside of the rotary drum from outside of the rotary drum and a discharge port for discharging the drying gas to outside of the rotary drum from inside of the rotary drum are formed in a perimeter wall that is a peripheral section of the rotary drum. When an inflow port and a discharge port are formed in the perimeter wall of the rotary drum in the drying step, the particulate support that has been sprayed with the catalyst solution can be efficiently dried.

In the presently disclosed method of producing a catalyst-bearing support, the inflow port and the discharge port are preferably formed at positions opposite each other relative to the central axis. When the inflow port and the discharge port are formed at positions opposite each other via the central axis, the particulate support that has been sprayed with the catalyst solution can be more efficiently dried.

In the presently disclosed method of producing a catalyst-bearing support, the central axis may form an angle of more than 20° and less than 90° relative to a horizontal direction. When the central axis forms an angle of more than 20° and less than 90° relative to a horizontal direction, it is possible to efficiently stir the particulate support housed inside of the rotary drum and also to increase the spraying area of the catalyst solution and the contacting area of the drying gas.

In the presently disclosed method of producing a catalyst-bearing support, it is preferable that, in the drying step, an inflow port for causing the drying gas to flow to inside of the perimeter wall is formed at a front side of the rotary drum in a direction of the central axis, and a discharge port for discharging the drying gas from inside of the perimeter wall rotary drum is formed at a rear side of the rotary drum in the direction of the central axis. When an inflow port is formed at a front end section of the rotary drum and a discharge port is formed at a rear end section of the rotary drum in the drying step, the particulate support that has been sprayed with the catalyst solution can be efficiently dried.

In the presently disclosed method of producing a catalyst-bearing support, it is preferable that either or both of the inflow port and the discharge port are formed in a mesh form and that the discharge port formed in the mesh form is a structure that allows passage of the drying gas and does not allow passage of the particulate support. When the inflow port and/or the discharge port is formed in a mesh form and when the discharge port formed in a mesh form allows passage of the drying gas and does not allow passage of the particulate support, the particulate support that has been sprayed with the catalyst solution can be more efficiently dried.

In the presently disclosed method of producing a catalyst-bearing support, the particulate support preferably has a particle density, in terms of apparent density, of 2.0 g/cm$^3$ or more. When the particle density (apparent density) of the particulate support is 2.0 g/cm$^3$ or more, aggregation of support particles through the catalyst solution can be inhibited, fluidity of the particulate support can be improved, and a catalyst layer can be more uniformly formed on the surface of the particulate support.

Note that the term "apparent density" as used in the present specification refers to density based on volume that is inclusive of the volume of closed pores inside of the particulate support. The apparent density can be measured using a pycnometer.

In the presently disclosed method of producing a catalyst-bearing support, the particulate support is preferably formed of a metal oxide. When the particulate support is formed of a metal oxide, heat resistance can be improved.

In the presently disclosed method of producing a catalyst-bearing support, the metal oxide may be zirconium dioxide, aluminum oxide, or zircon. When zirconium dioxide (zirconia), aluminum oxide, or zircon is used as the metal oxide, heat resistance can be further improved. In particular, an oxide that includes zirconium dioxide (zirconia) enables more uniform formation of a catalyst layer due to having high surface smoothness.

In the presently disclosed method of producing a catalyst-bearing support, the catalyst solution may contain one or more metals among Ni, Fe, Co, and Mo. When the catalyst solution contains one or more metals among Ni, Fe, Co, and Mo, a catalyst-bearing support that is suitable for fibrous carbon nanostructure production can be produced.

In the presently disclosed method of producing a catalyst-bearing support, the particulate support may include either or both of a foundation layer and a catalyst layer on a surface thereof. The aforementioned catalyst layer may be a catalyst layer that has previously been used, and thus a particulate support that has previously been used can be reused in the presently disclosed method.

The presently disclosed method of producing a catalyst-bearing support may further comprise a firing step of firing the particulate support at not lower than 50° C. and not higher than 900° C.

Moreover, the present disclosure aims to advantageously solve the problem set forth above, and a presently disclosed method of producing a fibrous carbon nanostructure comprises a step of supplying a source gas to a catalyst-bearing support obtained by the presently disclosed method of producing a catalyst-bearing support, and synthesizing a fibrous carbon nanostructure on the catalyst layer. By supplying a source gas to a catalyst-bearing support that has been obtained by the presently disclosed method of producing a catalyst-bearing support and by synthesizing a fibrous carbon nanostructure on the catalyst layer in this manner, it is possible to synthesize a fibrous carbon nanostructure such as a carbon nanotube with high efficiency and achieve excellent mass productivity.

Advantageous Effect

According to the present disclosure, it is possible to provide a method of producing a catalyst-bearing support that enables uniform formation of a catalyst layer on the surface of a particulate support.

Moreover, according to the present disclosure, it is possible to provide a method of producing a fibrous carbon nanostructure that enables high-efficiency synthesis of a fibrous carbon nanostructure such as a carbon nanotube and excels in terms of mass productivity.

BRIEF DESCRIPTION OF THE DRAWINGS

In the accompanying drawings:

FIG. 3 is a diagram for description of a case (case 2) in which a catalyst-bearing support is produced using the rotary drum flow device used in the first embodiment of the presently disclosed method of producing a catalyst-bearing support;

FIG. 5 is a diagram for description of a case (case 4) in which a catalyst-bearing support is produced using the rotary drum flow device used in the first embodiment of the presently disclosed method of producing a catalyst-bearing support;

DETAILED DESCRIPTION (Method of Producing Catalyst-Bearing Support)

The following provides a detailed description of the presently disclosed method of producing a catalyst-bearing support.

The presently disclosed method of producing a catalyst-bearing support can be used in production of a catalyst-bearing support that is used in production of a fibrous carbon nanostructure. Moreover, the presently disclosed method of producing a fibrous carbon nanostructure can suitably be used in production of a fibrous carbon nanostructure using a catalyst-bearing support that has been obtained by the presently disclosed method of producing a catalyst-bearing support. Note that the presently disclosed method of producing a catalyst-bearing support is implemented through a rotary drum flow device such as described below, for example.

Figure 1A:
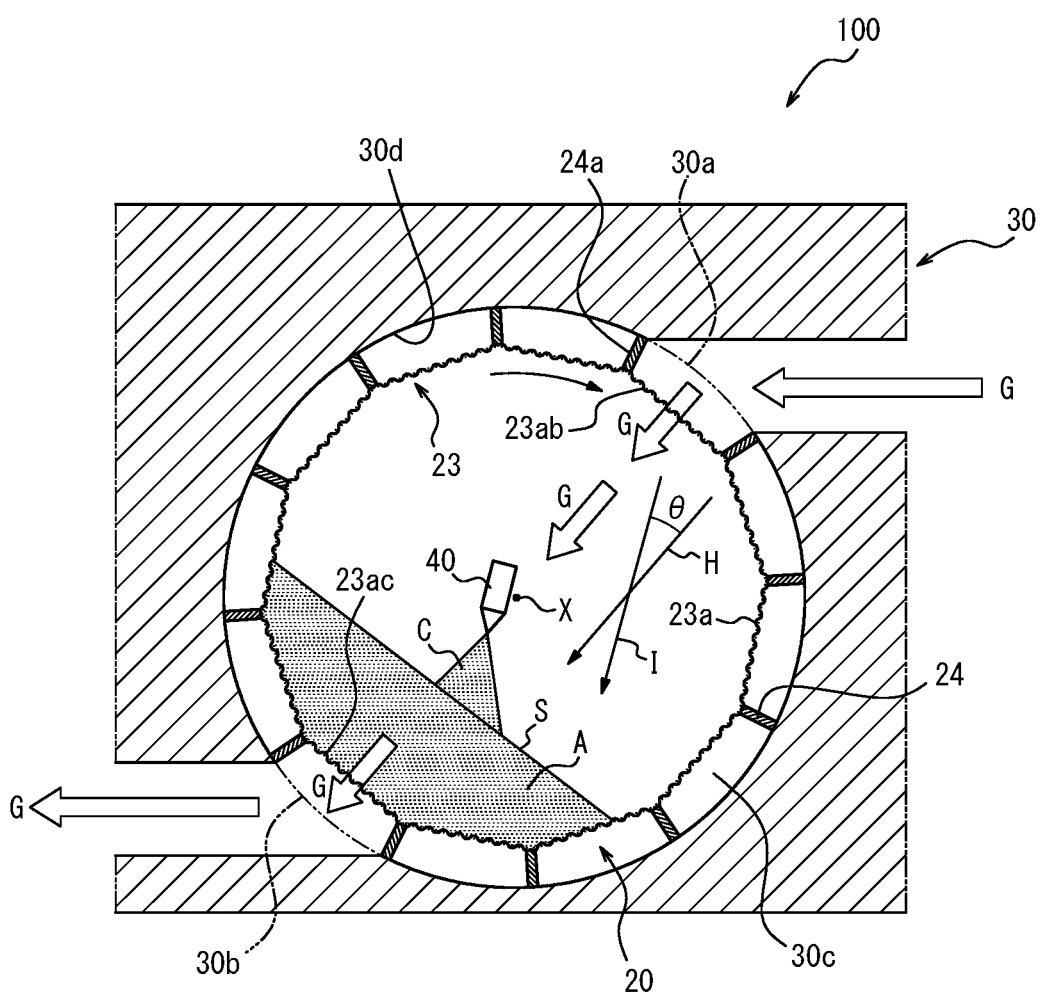
FIG. 1A is a schematic cross-sectional view illustrating schematic configuration of one example of a rotary drum flow device used in a first embodiment of the presently disclosed method of producing a catalyst-bearing support.
Figure 6A:
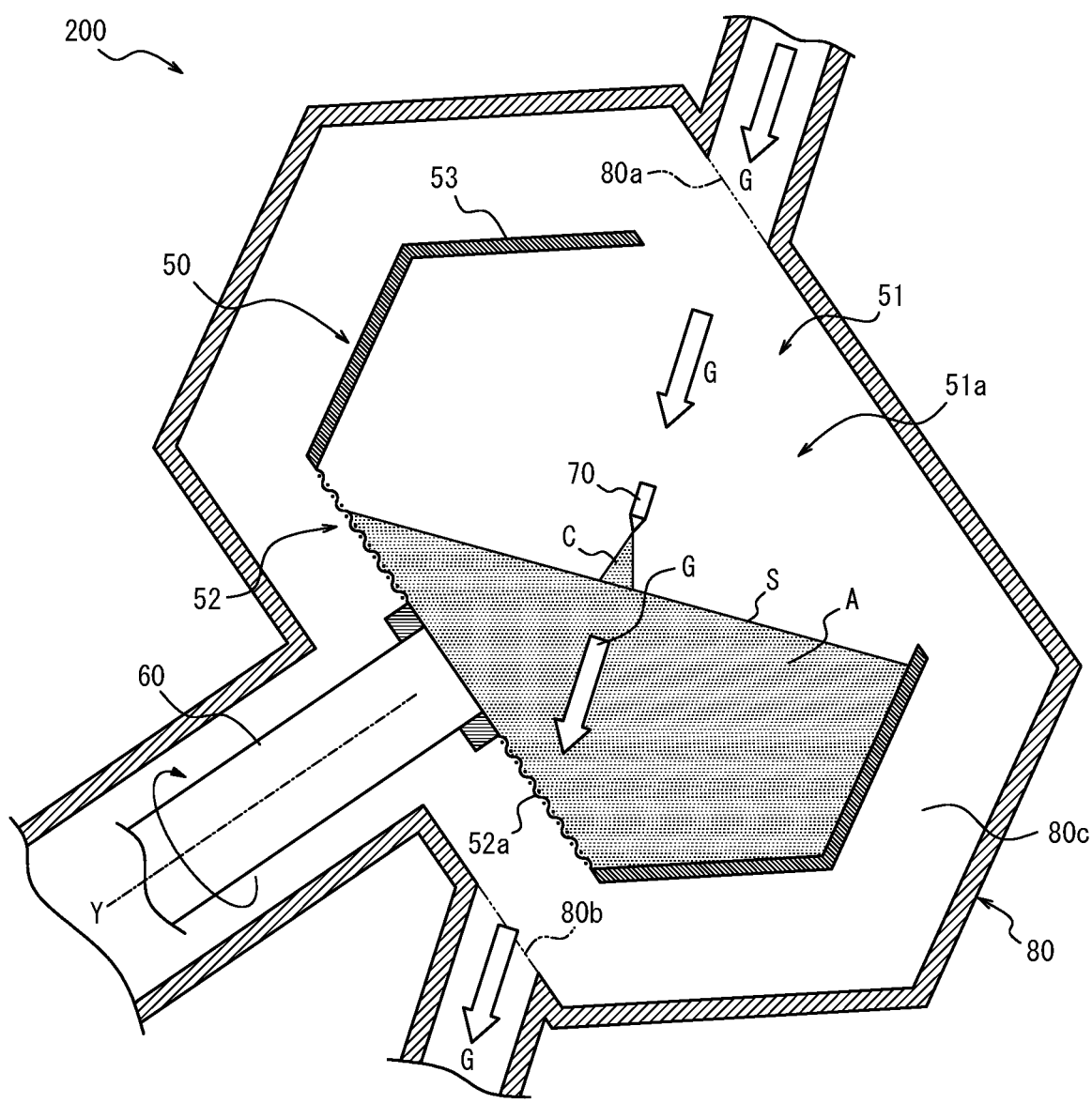
FIG. 6A is a schematic cross-sectional view illustrating schematic configuration of one example of a rotary drum flow device used in a second embodiment of the presently disclosed method of producing a catalyst-bearing support.

Specific examples of rotary drum flow devices that may be used include a rotary drum flow device illustrated in FIG. 1A (rotary drum flow device used in first embodiment of presently disclosed method of producing catalyst-bearing support) and a rotary drum flow device illustrated in FIG. 6A (rotary drum flow device used in second embodiment of presently disclosed method of producing catalyst-bearing support).

First Embodiment

First, a first embodiment of the presently disclosed method of producing a catalyst-bearing support is described.

Figure 1B:
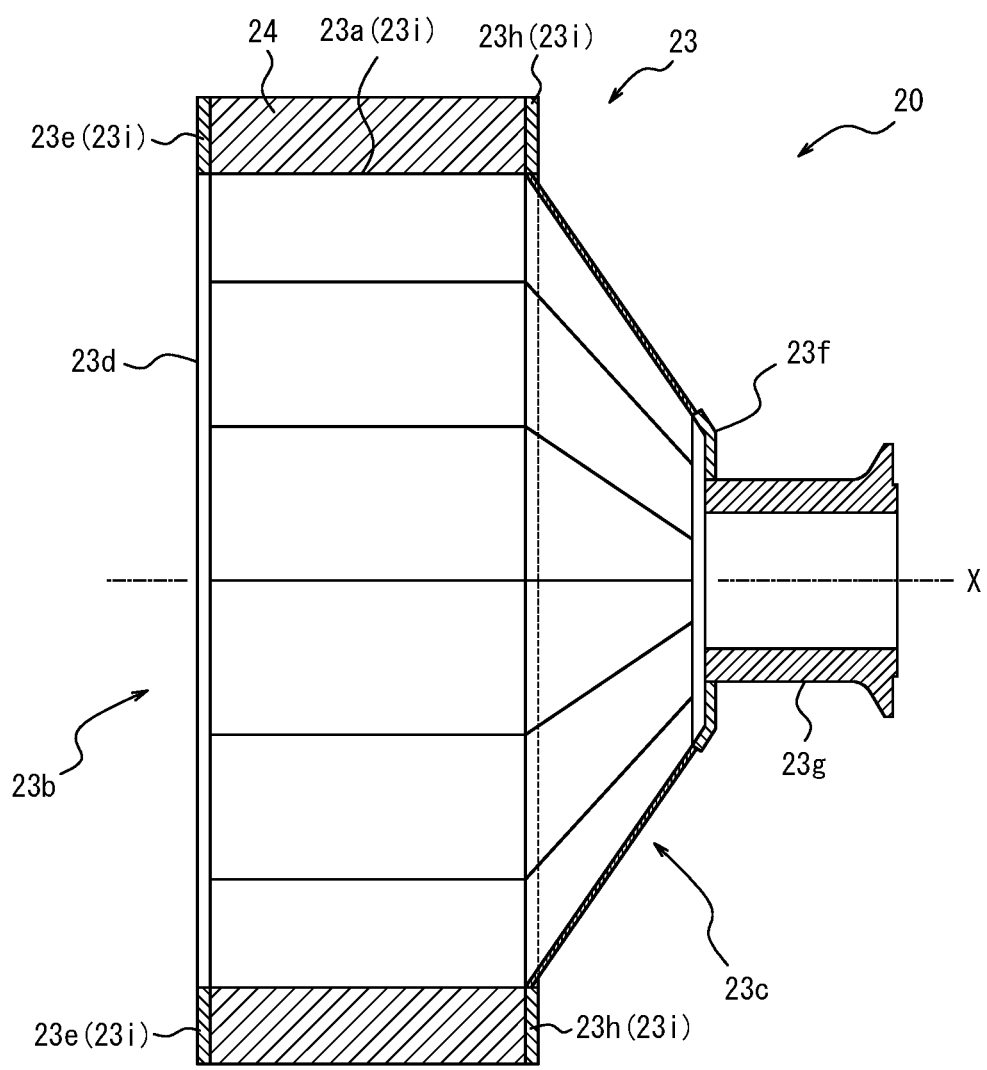
FIG. 1B is a central axis direction cross-sectional view illustrating schematic configuration of a rotary drum in the rotary drum flow device illustrated in FIG. 1A.

FIG. 1A is schematic cross-sectional view in a direction perpendicular to a central axis direction that illustrates schematic configuration of one example of a rotary drum flow device used in the first embodiment of the presently disclosed method of producing a catalyst-bearing support, and FIG. 1B is a central axis direction cross-sectional view that illustrates schematic configuration of a rotary drum in the rotary drum flow device illustrated in FIG. 1A.

As illustrated in FIGS. 1A and 1B, the rotary drum flow device 100 includes a housing 30, a rotary drum 20 that is housed inside of the housing 30 such as to be rotatable around a central axis X that is in a roughly horizontal direction, a rotation drive mechanism 23g that rotationally drives the rotary drum 20 around the central axis X, a spraying device 40 that serves as a spraying section for spraying a catalyst solution C against a particulate support A housed inside of the rotary drum 20, and a drying gas supplying device (not illustrated) for supplying a drying gas G into the housing 30. The phrase "roughly horizontal direction" as used in the present specification means that a smaller one of angles formed by a horizontal direction and the central axis X is not less than 0° and not more than 20°. Note that in the present embodiment, a front side of the rotary drum 20 is taken to be the left side in FIG. 1B (side corresponding to front end opening 23d) and a rear side of the rotary drum 20 is taken to be the right side in FIG. 1B (side corresponding to rotation drive mechanism 23g).

A gas supply port 30a for supplying the drying gas G to inside of the housing 30 and a gas discharge port 30b for discharging, from inside of the housing 30, drying gas G that has been supplied to inside of the housing 30 are formed in the housing 30. In addition, a gap 30c is provided between the housing 30 and the rotary drum 20, and subsequently described partitioning plates 24 are disposed in a moveable manner inside of the gap 30c. The gas supply port 30a and the gas discharge port 30b are disposed at positions opposite each other relative to the central axis X of the rotary drum 20.

Drying gas G inside of the rotary drum 20 flows along an inflow direction H as illustrated in FIG. 1A. When a spraying direction of the catalyst solution C is taken to be an arrangement direction I of the spraying device 40, this arrangement direction I forms an angle θ of not less than 0° and not more than 45° relative to the inflow direction H of the drying gas G inside of the rotary drum 20.

The rotary drum 20 includes a drum body 23 and a plurality of partitioning plates 24.

As illustrated in FIG. 1B, the drum body 23 includes a tube-shaped drum section 23i and a tapered section 23c that is disposed at the rear side of the drum section 23i and that narrows in diameter toward the rear side.

The drum section 23i includes a tube-shaped perimeter wall 23a that has a polygonal cross-sectional shape (dodecagon in the present embodiment), a ring-shaped front end ring 23e that is disposed at a front side of the perimeter wall 23a, and a rear end ring 23h that is disposed at a rear side of the perimeter wall 23a and that has the same shape as the front end ring 23e.

A circular front end opening 23d is formed in the front end ring 23e. Through this front end opening 23d, it is possible to supply a particulate support A to inside of the rotary drum 20 and also to discharge the particulate support A or a produced catalyst-bearing support from the rotary drum 20.

The inside of the tapered section 23c has a hollow shape that is connected to an internal space of the drum section 23i and can house a particulate support A that has been loaded via the front end opening 23d. At a rear side of the tapered section 23c, the rotation drive mechanism 23g for rotationally driving the rotary drum 20 is linked via a linking section 23f.

A ventilating section that connects the internal space of the rotary drum 20 with the gap 30c that is external to the rotary drum 20 is formed in the perimeter wall 23a. This ventilating section can, for example, have a mesh form in which a plurality of holes of dimensions that allow passage of the drying gas and do not allow passage of the particulate support are formed.

At the periphery of the perimeter wall 23a, the partitioning plates 24 are arranged between the front end ring 23e and the rear end ring 23h at specific intervals along the periphery of the perimeter wall 23a. Each of the partitioning plates 24 has roughly the same dimension as the perimeter wall 23a in a direction of the central axis X and is arranged in a parallel orientation to the central axis X of the rotary drum 20 at the periphery of the perimeter wall 23a. The partitioning plates 24 are disposed upright in a radial direction toward a peripheral side from vertices of the polygonal shape (dodecagon in FIG. 1A) of the perimeter wall 23a. During rotation of the rotary drum 20, the partitioning plates 24 slide along an inner surface 30d of the housing 30.

A plurality of connected spaces that are defined by the front end ring 23e, the rear end ring 23h, and the plurality of partitioning plates 24 disposed at the vertices of the polygonal shape are formed at the periphery of the perimeter wall 23a. Each of these connected spaces is open in an outward direction (opposite side to perimeter wall 23a). Accordingly, connected spaces are formed in plurality in accordance with the number of sides of the polygonal shape at the periphery of the perimeter wall 23a. In the case of the present embodiment, 12 of the above-described connected spaces are formed because the perimeter wall 23a has a dodecagonal cross-sectional shape. The open section of each of the connected spaces is formed with dimensions that are roughly the same as the gas supply port 30a formed in the housing 30 such that drying gas G supplied from the gas supply port 30a is supplied into each of the connected spaces and is inhibited from flowing out into the gap 30c by the partitioning plates 24, which enables reliable supply of the drying gas G to inside of the rotary drum 20. Moreover, the open section of each of the connected spaces is formed with dimensions that are roughly the same as the gas discharge port 30b formed in the housing 30, and thus drying gas G inside of the rotary drum 20 can be reliably discharged through each of the connected spaces to outside of the housing 30, via the gas discharge port 30b.

In the subsequently described drying step, a ventilating section in the perimeter wall 23a that is at a position opposite the gas supply port 30a functions as an inflow port 23ab for causing the drying gas G to flow to inside of the rotary drum 20 and a ventilating section in the perimeter wall 23a that is at a position opposite the gas discharge port 30b functions as a discharge port 23ac for discharging the drying gas from inside of the rotary drum 20. In other words, in one example, a ventilating section that is formed in a mesh form in the perimeter wall 23a constitutes an inflow port 23ab at a timing at which the ventilating section moves to a position corresponding to the gas supply port 30a in accompaniment to rotation of the rotary drum 20 during the drying step and constitutes a discharge port 23ac at a timing at which the ventilating section moves to a position corresponding to the gas discharge port 30b in accompaniment to rotation of the rotary drum 20 during the drying step.

The inflow port 23ab is located further upward in the direction of gravity (vertical direction) than the spraying device 40 relative to a surface S of a layer formed by the particulate support A (particulate support layer) during rotation of the rotary drum 20, whereas the discharge port 23ac is located further downward in the direction of gravity (vertical direction) than the spraying device 40 relative to the surface S of the layer formed by the particulate support A (particulate support layer) during rotation of the rotary drum 20.

Note that the length La (not illustrated) of a perpendicular line from the inflow port 23ab to the surface S of the layer formed by the particulate support A (particulate support layer) during rotation of the rotary drum 20 and the length Lb (not illustrated) of a perpendicular line from the discharge port 23ac to the surface S of the layer formed by the particulate support A (particulate support layer) during rotation of the rotary drum 20 preferably satisfy a relationship of La>Lb as illustrated in FIG. 1A, for example.

The following describes operation of the rotary drum flow device 100.

First, a particulate support A is loaded into the rotary drum 20 from the front end opening 23d provided in the front end section 23b of the rotary drum 20. Next, the rotary drum 20 that has been loaded with the particulate support A is rotated around the central axis X as a center through operation of the rotation drive mechanism 23g. In accompaniment to this rotation of the rotary drum 20, the particulate support A that is housed inside of the rotary drum 20 is swept upward in the direction of gravity (vertical direction) and subsequently flows downward in the direction of gravity (vertical direction) through the gravitational effect of its own weight, which thereby enables efficient upward and downward flow of the particulate support A in the direction of gravity (vertical direction) and also enables efficient stirring of the particulate support A.

Next, a catalyst solution C is sprayed from the spraying device 40 against the particulate support A flowing inside of the rotary drum 20 and a drying gas G is caused to pass the gas supply port 30a, the inflow port 23ab, the particulate support A housed inside of the rotary drum 20, the discharge port 23ac, and the gas discharge port 30b in order so as to dry the surface of the particulate support A to which the catalyst solution C has attached and obtain a particulate support A having a catalyst coating film formed thereon.

Note that drying gas G that has been supplied from the drying gas supplying device to the housing 30 and has reached the gas supply port 30a collides with a partitioning plate 24a (FIG. 1A) that is moving in a roughly opposite direction to the inflow direction of the drying gas G through rotation of the rotary drum 20. This can inhibit the drying gas G from passing through the gap 30c of the housing 30 without flowing to inside of the rotary drum 20 and can cause substantially all of the drying gas G that has been supplied to the gas supply port 30a to flow to inside of the rotary drum 20.

The open area of the gas discharge port 30b is designed such as to be smaller than the area of the surface S of the layer formed by the particulate support A inside of the rotary drum 20. This can effectively inhibit the drying gas G from passing through the gap 30c without coming into contact with the particulate support A. In this manner, substantially all of the drying gas G that has been supplied to the gas supply port 30a can pass the gas supply port 30a, the inflow port 23ab, the particulate support A housed inside of the rotary drum 20, the discharge port 23ac, and the gas discharge port 30b in order.

The rotation speed of the rotary drum 20 in the rotary drum flow device 100 that is used in the first embodiment of the presently disclosed method of producing a catalyst-bearing support is preferably 1 rpm or more, more preferably 3 rpm or more, and particularly preferably 5 rpm or more, and is preferably 100 rpm or less, more preferably 50 rpm or less, and particularly preferably 30 rpm or less, though the rotation speed that is set may differ depending on differences in terms of device diameter.

A sufficient stirring effect can be obtained when the rotation speed of the rotary drum 20 is 1 rpm or more, whereas the particulate support A can be inhibited from staying closely attached to an inner wall surface of the perimeter wall 23a of the rotary drum 20 due to centrifugal force when the rotation speed of the rotary drum 20 is 100 rpm or less.

In the rotary drum 20 of the rotary drum flow device 100 that is used in the first embodiment of the presently disclosed method of producing a catalyst-bearing support, it is preferable that the inflow direction H of the drying gas G inside of the rotary drum 20 and the arrangement direction I of the spraying device 40, which is the spraying direction of the catalyst solution C, are each roughly perpendicular relative to the surface S of the layer formed by the particulate support A (particulate support layer) housed inside of the rotary drum 20 during rotation as illustrated in FIG. 1A. When the inflow direction H and the arrangement direction I are each approximately perpendicular relative to the surface S of the layer formed by the particulate support A (particulate support layer) housed inside of the rotary drum 20 during rotation in this manner, the catalyst solution C can be efficiently sprayed against the particulate support A, and the particulate support A that has been sprayed with the catalyst solution C can be efficiently dried.

In a case in which a metering pump is included in the spraying device 40 that serves as a spraying section in the rotary drum 20 of the rotary drum flow device 100 used in the first embodiment of the presently disclosed method of producing a catalyst-bearing support, the spraying device 40 can feed the catalyst solution C in a quantitative manner and can easily control the flow rate of the catalyst solution C. Moreover, in a case in which the spraying device 40 serving as a spraying section includes an automatic spray gun, the spraying device 40 can perform spray coating of a fine and uniform mist and can implement precise coating with a low agglomerate formation rate and uniform particle diameter. Although no specific limitations are placed on the spraying device 40 serving as a spraying section, the spraying device 40 may be a two-fluid nozzle or may include a mist generator such as an ultrasonic atomizer.

The spraying device 40 serving as a spraying section is preferably disposed in a roughly perpendicular direction (90°±30°) relative to the surface S of the layer formed by the particulate support A (particulate support layer) during rotation, and is preferably a distance of not less than 30 mm and not more than 1,000 mm from the surface S of the layer formed by the particulate support A (particulate support layer) during rotation.

The following describes a catalyst-bearing support that is produced in the first embodiment of the presently disclosed method of producing a catalyst-bearing support.

<<Catalyst-Bearing Support>>

A catalyst-bearing support that is produced by the presently disclosed method of producing a catalyst-bearing support includes a particulate support and a catalyst layer that is formed at an outermost surface of the particulate support. In other words, the catalyst-bearing support is a catalyst-bearing support that has been produced by the presently disclosed method of producing a catalyst-bearing support and that may include just one catalyst layer or a plurality of catalyst layers, for example, so long as it has a catalyst formed at the outermost surface thereof.

The catalyst-bearing support acts to mediate, promote, or increase efficiency of synthesis and growth of a fibrous carbon nanostructure at a reaction site, for example. The catalyst-bearing support may have a role of taking in a carbon source from a supplied source gas at the surface thereof and synthesizing a fibrous carbon nanostructure such as a carbon nanotube, but is not specifically limited to having this role. More specifically, in a case in which the catalyst has a fine particulate form, for example, each of the catalyst particles continues to produce carbon while manufacturing a tube-shaped structure or the like having a diameter corresponding to the size of the catalyst particle so that a fibrous carbon nanostructure is synthesized and grown. Note that the catalyst-bearing support is normally used after the catalyst-bearing support has been brought into contact with a high-temperature reducing gas (for example, hydrogen gas, ammonia, water vapor, or a mixed gas thereof) in order to reduce the catalyst.

{Particulate Support}

The particulate support is a part that has a particle shape formed of any material and that constitutes a host structure for loading of the catalyst at the support surface by attachment, fixing, deposition, formation, or the like. The use of a particulate support in this manner normally results in the catalyst-bearing support that is produced using the particulate support also having a particulate form.

Note that "particulate" means forming a roughly particle shape, with an aspect ratio of 10 or less being preferable. When the particulate support has an aspect ratio of 10 or less, the subsequently described catalyst solution can be uniformly sprayed.

Note that the "aspect ratio of the particulate support" referred to in the present disclosure can be determined by measuring the minor diameter and major diameter of 100 randomly selected particles of the particulate support using a transmission electron microscope.

In terms of structure, the particulate support may be composed of just a particulate support or may be a foundation layer-equipped particulate support that is provided with any foundation layer in order to enable good loading of the catalyst on the surface of the particulate support. The foundation layer may be formed of any material and can, for example, be formed as one layer or as two or more layers at the surface of the particulate support. Note that the particulate support is preferably a foundation layer-equipped particulate support from a viewpoint of causing good loading of the catalyst onto the particulate support and then effectively using the catalyst-bearing support.

The composition of the foundation layer is not specifically limited and can be selected as appropriate depending on the type of the particulate support and the type of the subsequently described catalyst. The foundation layer can be formed of a ceramic material such as alumina, titania, titanium nitride, or silicon oxide, for example. Moreover, the thickness of the foundation layer that is formed can be adjusted as appropriate depending on the loaded amount of catalyst that is desired. The foundation layer can be formed at the surface of the particulate support by, for example, implementing the subsequently described spraying step, drying step, and firing step with a solution for forming the aforementioned ceramic material instead of a catalyst solution.

The particulate support may also include a catalyst layer on the surface thereof. The catalyst layer may be a catalyst layer that has previously been used, and, in this case, a particulate support that has previously been used can be reused in the presently disclosed method.

The particle density (apparent density) of the particulate support is preferably 2.0 g/cm$^3$ or more, and more preferably 3.5 g/cm$^3$ or more, and is preferably 9.0 g/cm$^3$ or less, and more preferably 6.0 g/cm$^3$ or less. When the particle density (apparent density) of the particulate support is within any of the ranges set forth above, aggregation of support particles through the catalyst solution can be inhibited, fluidity of the particulate support can be improved, and a catalyst layer can be more uniformly formed on the surface of the particulate support.

The material of the particulate support is not specifically limited but preferably includes a metal oxide, more preferably includes a metal oxide containing one or more elements selected from the group consisting of magnesium (Mg), aluminum (Al), silicon (Si), zirconium (Zr), and molybdenum (Mo), and even more preferably is formed of a metal oxide such as zirconium dioxide (zirconia), aluminum oxide, or zircon. When the particulate support is formed of a metal oxide, heat resistance can be improved. Moreover, when zirconium dioxide (zirconia), aluminum oxide, or zircon is used as the metal oxide, heat resistance can be further improved.

The particle diameter (diameter) of the particulate support is not specifically limited but is preferably not less than 50 μm and not more than 10 mm. Separation of the particulate support and CNTs can easily be performed after CNT synthesis when the diameter of the particulate support is 50 μm or more, whereas the total surface area of particles in the same volume increases, and thus CNT production efficiency can be increased when the diameter of the particulate support is 10 mm or less. Note that the "particle diameter (diameter)" of the particulate support is the volume-average particle diameter D50. The volume-average particle diameter D50 represents the particle diameter at which, in a particle size distribution (by volume) for the particulate support measured by laser diffraction, cumulative volume calculated from a small diameter end of the distribution reaches 50%.

In the presently disclosed method of producing a catalyst-bearing support, it is possible to use a particulate support having a large particle diameter because there is no need to cause suspension of the particulate support as is the case with a conventional fluidized bed method, for example. This makes it possible to increase the opening size of the mesh in the ventilating section that is provided in order to prevent the catalyst-bearing support from falling out of the rotary drum, and thus makes it possible to reduce pressure loss of the ventilating section.

The porosity of the particulate support is preferably 10% or less. When the porosity of the particulate support is 10% or less, a more uniform catalyst layer can be formed.

{Catalyst}

The catalyst is loaded on the surface of the particulate support described above. The catalyst-bearing support may have a configuration in which the catalyst is directly loaded on the surface of the particulate support as a catalyst layer or may have a configuration in which the catalyst is indirectly loaded on the surface of the particulate support via the previously described foundation layer or the like (for example, having a configuration of "particulate support/foundation layer/catalyst layer" from an inner side). Moreover, the foundation layer and/or catalyst layer may optionally be provided as a plurality of layers, for example.

The catalyst is normally present at the outermost surface of the catalyst-bearing support and acts to promote fibrous carbon nanostructure synthesis.

The following describes each step of the first embodiment of the presently disclosed method of producing a catalyst-bearing support.

The first embodiment of the presently disclosed method of producing a catalyst-bearing support includes: a step of rotating the approximately circular tube-shaped rotary drum 20 housing the particulate support A inside thereof around the central axis X so as to stir the particulate support A (stirring step); a step of spraying the catalyst solution C against the particulate support A inside of the rotary drum (spraying step); and a step of causing the drying gas G to flow to inside of the rotary drum 20 from outside of the rotary drum 20 and causing contact of the drying gas G with the particulate support A that has been sprayed with the catalyst solution C so as to dry the catalyst solution C (drying step). Note that a step of firing the particulate support A at not lower than 50° C. and not higher than 900° C. (firing step) may optionally be further included after the drying step. In the present embodiment, at least part of an implementation period of the stirring step and at least part of an implementation period of the spraying step overlap with each other.

<<Stirring Step>>

In the stirring step, the rotary drum 20 housing the particulate support A inside thereof is rotated around the central axis X.

By rotating the rotary drum 20 around the central axis X in this manner, the particulate support A that is housed inside of the rotary drum 20 is swept upward in the direction of gravity (vertical direction) in accompaniment to rotation of the rotary drum 20 and subsequently flows downward in the direction of gravity (vertical direction) through the gravitational effect of its own weight, thereby enabling efficient stirring of the particulate support A.

The temperature during stirring can be selected as appropriate depending of the type of the particulate support A, the composition of the subsequently described catalyst solution C, and so forth without any specific limitations.

<<Spraying Step>>

In the spraying step, the catalyst solution is sprayed against the particulate support inside of the rotary drum. Since at least part of the implementation period of the stirring step and at least part of the implementation period of the spraying step overlap with each other in the present embodiment as previously described, the spraying step includes a period during which the particulate support A is sprayed with the catalyst solution C while being stirred. This enables uniform formation of a coating film by the catalyst solution C on the surface of the particulate support A.

The method by which the catalyst solution C is sprayed at the particulate support A is not specifically limited and may, for example, suitably be a method in which the catalyst solution C is sprayed from a spraying device 40 (spraying means) such as a spray gun or a spray nozzle.

Commonly known conditions can be adopted without any specific limitations as the conditions of spraying of the catalyst solution C at the particulate support A, and the sprayed amount of the catalyst solution C, the size of the sprayed particles (mist), the spraying time, and so forth can be selected as appropriate. In a case in which a spray gun or the like is used in the spraying, the spraying air pressure is preferably approximately not less than 0.1 MPa and not more than 0.5 MPa, for example.

Note that in a case in which two or more types of catalyst solutions C are to be sprayed, a mixture of the two or more catalyst solutions C may be sprayed from a single spraying device 40 (spraying means), or the two or more catalyst solutions C may be sprayed using separate spraying devices 40 (spraying means), but spraying using separate spraying devices 40 (spraying means) is preferable.

{Catalyst Solution}

It is preferable that one or more metals among nickel (Ni), iron (Fe), cobalt (Co), and molybdenum (Mo) is included as a catalyst component contained in the catalyst solution C. When the catalyst solution contains one or more metals among nickel (Ni), iron (Fe), cobalt (Co), and molybdenum (Mo), this enables function as a catalyst for CNT synthesis.

Specific examples of the catalyst component contained in the catalyst solution include iron acetate, ferrocene, iron acetylacetonate, and cobalt acetate.

Although various organic solvents such as alcohols, glycols, ketones, ethers, esters, and hydrocarbons can be used as a solvent contained in the catalyst solution C, the use of an alcohol is preferable. These organic solvents may be used individually or as a mixture of two or more types of organic solvents. The alcohol is preferably methanol, ethanol, isopropyl alcohol, or the like in terms of handleability and preservation stability. Moreover, the catalyst solution C may contain water. The catalyst solution C may contain both a solvent and water or may contain either one of a solvent and water.

Note that the catalyst component is preferably dissolved in the water and/or solvent in the catalyst solution C.

The solid content concentration of the catalyst solution C is not specifically limited but is preferably 20 mass % or less, and more preferably 10 mass % or less. When the solid content concentration of the catalyst solution C is 20 mass % or less, this provides coating film stabilization and results in a catalyst-bearing support having a catalyst layer uniformly formed at the surface of a particulate support, thereby enabling high-efficiency synthesis of a fibrous carbon nanostructure such as a carbon nanotube and excellent mass productivity. The catalyst solution C may also contain a component of the previously described foundation layer.

<<Drying Step>>

In the drying step, the particulate support A that has been sprayed with the catalyst solution C is dried to thereby enable formation of a uniform catalyst coating film on the surface of the particulate support A. More specifically, a drying gas G is caused to flow to inside of the rotary drum 20 from outside of the rotary drum 20 and the drying gas G is brought into contact with the particulate support A that has been sprayed with the catalyst solution C in the previously described spraying step so as to dry catalyst solution C that has attached to the surface of the particulate support A and form a catalyst coating film. The particulate support A on which the catalyst coating film has been formed may be used in that form as a catalyst-bearing support. However, depending on the composition of the catalyst solution C, a subsequently described firing step may be performed with respect to the particulate support A on which the catalyst coating film has been formed, as necessary, following on after the drying step. The catalyst coating film constitutes a catalyst layer.

The drying gas G that is used in the drying step may be compressed air, nitrogen, or the like, for example, without any specific limitations. The term "drying gas" as used in the present specification refers to a gas that is used for the purpose of drying a particulate support that has been sprayed with a catalyst solution. Accordingly, the "drying gas" itself may have any attributes. For example, no specific limitations are placed on the dew point and the like of the drying gas.

The temperature of the drying gas G is not specifically limited but is preferably 0° C. or higher, more preferably 20° C. or higher, and even more preferably 25° C. or higher, and is preferably 200° C. or lower, and more preferably 100° C. or lower. By causing the drying gas G to flow in while in a temperature adjusted state of not lower than 0° C. and not higher than 200° C. in the drying step, the particulate support A is placed in a heated and fluidized state, and thus the catalyst solution C can be rapidly dried, cissing can be inhibited, and a catalyst coating film can be more uniformly formed on the surface of the particulate support A even in a situation in which the sprayed catalyst solution C has a high surface tension.

The amount of the drying gas that is supplied is not specifically limited but is preferably 50 L/min or more, and more preferably 100 L/min or more, and is preferably 10,000 L/min or less.

A sufficient drying effect can be obtained when the supplied amount of the drying gas is 50 L/min or more, whereas scattering of the particulate support A by the drying gas G can be inhibited, and drying of spray droplets prior to becoming attached to the particulate support A can be inhibited when the supplied amount of the drying gas is 10,000 L/min or less.

The atmosphere concentration (solvent concentration) inside of the rotary drum 20 during the drying step is not specifically limited but is preferably 2 volume % or less, and more preferably 1 volume % or less. Drying can be stabilized through the atmosphere concentration (solvent concentration) inside of the rotary drum 20 being not more than any of the upper limits set forth above.

<<Firing Step>>

The particulate support A that has undergone the drying step may be fired at not lower than 50° C. and not higher than 900° C. in the firing step.

The firing may be performed using a muffle furnace or a fluidized bed or rotary kiln after the particulate support A having the catalyst coating film formed at the surface thereof has been removed from the rotary drum 20 or may be performed inside of the rotary drum 20 without removing the particulate support A from the rotary drum 20. Note that the firing is preferably performed in an oxygen atmosphere. The firing temperature is preferably approximately 300° C. or higher. The firing time is preferably not less than 5 minutes and not more than 60 minutes, and more preferably not less than 5 minutes and not more than 40 minutes. A coating film that contains aluminum, for example, requires firing at 300° C. or higher. Moreover, a coating film that contains iron catalyst, for example, requires firing at 80° C. or higher.

The thickness of the catalyst layer is normally within a range of 0.1 nm to 100 nm. The thickness of a catalyst layer that contains a component of the previously described foundation layer is preferably not less than 10 nm and not more than 100 nm, whereas the thickness of a catalyst layer that does not contain a component of the previously described foundation layer is preferably not less than 0.1 nm and not more than 10 nm.

In the first embodiment of the presently disclosed method of producing a catalyst-bearing support, it is preferable that at least part of the implementation period of the stirring step, at least part of the implementation period of the spraying step, and at least part of an implementation period of the drying step overlap with one another. By adopting this configuration, throughput improves, and a catalyst-bearing support having a catalyst layer uniformly formed on the surface of a particulate support is efficiently obtained. No specific limitations are placed on the start timing of each of the steps. The stirring step may start and then the spraying step and the drying step may start simultaneously or sequentially, all three of these steps may start simultaneously, or the spraying step may start in advance and then the stirring step and the drying step may start simultaneously or sequentially. Likewise, no specific limitations are placed on the end timing of each of the steps. For example, the spraying step may end before the other steps and then the stirring step and the drying step may end simultaneously or sequentially, or all of the steps may end simultaneously.

In the first embodiment of the presently disclosed method of producing a catalyst-bearing support, droplets of the catalyst solution C that have been sprayed from the spraying device 40 (spraying means) become attached to the particulate support A that is a spraying target before drying thereof occurs (before volatilization of solvent in the droplets), and the attached catalyst solution C subsequently dries (solvent in the attached catalyst solution C volatilizes) to form a coating film, and thus a catalyst layer can be uniformly formed on the surface of the particulate support A. Note that the drying rate of the catalyst solution C can be adjusted by adjusting (i) the volatility of the solvent in the catalyst solution C, (ii) the size of the droplets, (iii) the spraying speed of the catalyst solution C, (iv) the supplied amount of the drying gas G, (v) the temperature of the drying gas G, and so forth, for example.

The following describes specific examples of a procedure by which a catalyst-bearing support is produced using the first embodiment of the presently disclosed method of producing a catalyst-bearing support. Note that the following specific examples are not limitations, that firing may be omitted, and that a one-type one-layer structure may be adopted.

Figures 2A, 2B, 2C, 2D:
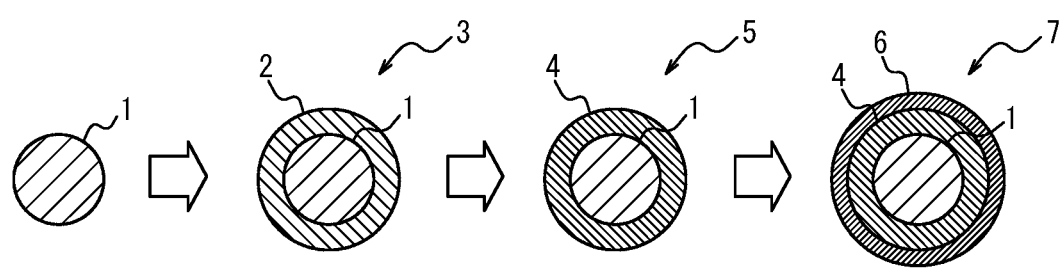
FIG. 2 is a diagram for description of a case (case 1) in which a catalyst-bearing support is produced using the rotary drum flow device used in the first embodiment of the presently disclosed method of producing a catalyst-bearing support.

FIG. 2 is a diagram for description of a case in which a catalyst-bearing support having a "particulate support/foundation layer (aluminum oxide layer)/iron catalyst layer" configuration (three-layer configuration) is produced using the rotary drum flow device that is used in the first embodiment of the presently disclosed method of producing a catalyst-bearing support.

First, a particulate support 1 is prepared ((a) in FIG. 2). Next, the prepared particulate support 1 (particulate support A) is loaded into the rotary drum 20 via the front end opening 23d and is stirred (stirring step) while, in order to form a foundation layer, an aluminum-containing solution is sprayed using the spraying device 40 (spraying step) and is dried using a drying gas G that has flowed to inside of the rotary drum 20 via the gas supply port 30a and the inflow port 23ab (drying step) to thereby form a coating film 2 that contains aluminum and produce a coating film-equipped particulate support 3 having the coating film 2 formed at the surface thereof ((b) in FIG. 2). Next, the coating film-equipped particulate support 3 having the coating film 2 formed at the surface thereof is fired (firing step) so as to produce a foundation layer-equipped particulate support 5 having a foundation layer 4 formed of aluminum oxide ($Al_2O_3$) at the surface of the particulate support 1 ((c) in FIG. 2). Next, the foundation layer-equipped particulate support 5 is loaded into the rotary drum 20 via the front end opening 23d and is stirred (stirring step) while an iron-containing solution is sprayed as a catalyst solution C using the spraying device 40 (spraying step) and is dried using a drying gas G that has flowed to inside of the rotary drum 20 via the gas supply port 30a and the inflow port 23ab (drying step) to thereby obtain a catalyst-bearing support formed of a particulate support 7 having a coating film 6 that contains iron catalyst formed at the surface thereof ((d) in FIG. 2).

FIG. 3 is a diagram for description of a case in which a catalyst-bearing support having a "particulate support/foundation layer (aluminum oxide layer)/iron oxide layer" configuration (three-layer configuration) is produced using the rotary drum flow device that is used in the first embodiment of the presently disclosed method of producing a catalyst-bearing support.

First, a particulate support 1 is prepared ((a) in FIG. 3). Next, the prepared particulate support 1 (particulate support A) is loaded into the rotary drum 20 via the front end opening 23d and is stirred (stirring step) while, in order to form a foundation layer, an aluminum-containing solution is sprayed using the spraying device 40 (spraying step) and is dried using a drying gas G that has flowed to inside of the rotary drum 20 via the gas supply port 30a and the inflow port 23ab (drying step) to thereby form a coating film 2 that contains aluminum and produce a coating film-equipped particulate support 3 having the coating film 2 formed at the surface thereof ((b) in FIG. 3). Next, the coating film-equipped particulate support 3 having the coating film 2 formed at the surface thereof is fired (firing step) so as to produce a foundation layer-equipped particulate support 5 having a foundation layer 4 formed of an aluminum oxide layer at the surface of the particulate support 1 ((c) in FIG. 3). Next, the foundation layer-equipped particulate support 5 is loaded into the rotary drum 20 via the front end opening 23d and is stirred (stirring step) while an iron-containing solution is sprayed as a catalyst solution C using the spraying device 40 (spraying step) and is dried using a drying gas G that has flowed to inside of the rotary drum 20 via the gas supply port 30a and the inflow port 23ab (drying step) to thereby obtain a catalyst coating film-equipped particulate support 7 having a coating film 6 that contains iron catalyst formed at the surface thereof ((d) in FIG. 3). Finally, the catalyst coating film-equipped particulate support 7 is fired (firing step) so as to obtain a catalyst-bearing support 11 having an iron oxide layer 10 (catalyst layer) formed at the surface of the foundation layer-equipped particulate support 5 ((e) in FIG. 3).

Figures 4A, 4B, 4C:
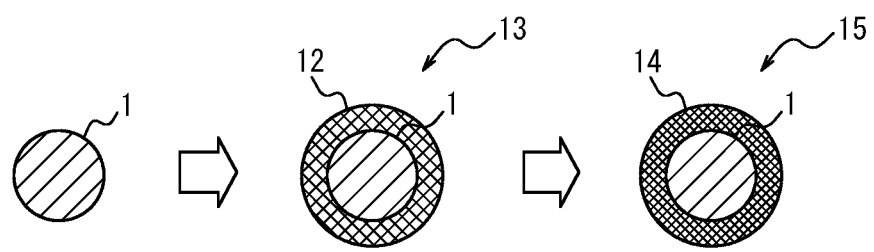
FIG. 4 is a diagram for description of a case (case 3) in which a catalyst-bearing support is produced using the rotary drum flow device used in the first embodiment of the presently disclosed method of producing a catalyst-bearing support.

FIG. 4 is a diagram for description of a case in which a catalyst-bearing support having a "particulate support/catalyst layer formed of aluminum oxide and iron oxide" configuration (two-layer configuration) is produced using the rotary drum flow device that is used in the first embodiment of the presently disclosed method of producing a catalyst-bearing support.

First, a particulate support 1 is prepared ((a) in FIG. 4). Next, the prepared particulate support 1 (particulate support A) is loaded into the rotary drum 20 via the front end opening 23d and is stirred (stirring step) while a catalyst solution C containing aluminum and iron is sprayed using the spraying device 40 (spraying step) and is dried using a drying gas G that has flowed to inside of the rotary drum 20 via the gas supply port 30a and the inflow port 23ab (drying step) to thereby form a coating film 12 that contains aluminum and iron catalyst and produce a coating film-equipped particulate support 13 ((b) in FIG. 4). Next, the coating film-equipped particulate support 13 is fired (firing step) so as to obtain a catalyst-bearing support 15 having a catalyst layer 14 that contains aluminum oxide and iron oxide formed at the surface of the particulate support 1 ((c) in FIG. 4).

FIG. 5 is a diagram for description of a case in which a catalyst-bearing support having a "particulate support/catalyst layer formed of aluminum oxide and iron oxide/iron oxide layer" configuration (three-layer configuration) is produced using the rotary drum flow device that is used in the first embodiment of the presently disclosed method of producing a catalyst-bearing support.

First, a particulate support 1 is prepared ((a) in FIG. 5). Next, the prepared particulate support 1 (particulate support A) is loaded into the rotary drum 20 via the front end opening 23d and is stirred (stirring step) while a catalyst solution C containing aluminum and iron is sprayed using the spraying device 40 (spraying step) and is dried using a drying gas G that has flowed to inside of the rotary drum 20 via the gas supply port 30a and the inflow port 23ab (drying step) to thereby form a coating film 12 that contains aluminum and iron catalyst and produce a coating film-equipped particulate support 13 ((b) in FIG. 5). Next, the coating film-equipped particulate support 13 is fired (firing step) so as to obtain a catalyst-bearing support 15 having a catalyst layer 14 that contains aluminum oxide and iron oxide formed at the surface of the particulate support 1 ((c) in FIG. 5). Next, the particulate support 15 on which the catalyst layer 14 has been formed is loaded into the rotary drum 20 via the front end opening 23d and is stirred (stirring step) while an iron-containing solution is sprayed as a catalyst solution C using the spraying device 40 (spraying step) and is dried using a drying gas G that has flowed to inside of the rotary drum 20 via the gas supply port 30a and the inflow port 23ab (drying step) to thereby form a coating film 16 that contains iron catalyst and produce a catalyst coating film-equipped particulate support 17 ((d) in FIG. 5). Finally, the catalyst coating film-equipped particulate support 17 is fired (firing step) so as to produce a catalyst-bearing support 19 having an iron oxide layer 18 formed as a catalyst layer at the surface of the particulate support 1 on which the catalyst layer 14 has been formed ((e) in FIG. 5).

Note that although a configuration in which the central axis X is a roughly horizontal direction was adopted in the first embodiment, this configuration is not a limitation. A configuration in which a central axis Y corresponding to the central axis X is inclined from a horizontal direction may be adopted such as described in the subsequently described second embodiment, and no specific limitations are placed on this inclination angle.

Moreover, although a configuration was adopted in which the drying gas G is supplied and discharged with respect to the inside of the rotary drum 20 through a perimeter wall 23a that corresponds to the periphery of the rotary drum 20, no specific limitations are placed on the supply position and the discharge position of the drying gas G.

Second Embodiment

Next, a second embodiment of the presently disclosed method of producing a catalyst-bearing support is described. Note that description of parts that are the same as in the first embodiment of the presently disclosed method of producing a catalyst-bearing support set forth above is omitted, whereas a rotary drum flow device that is a differing part is described.

Figure 6B:
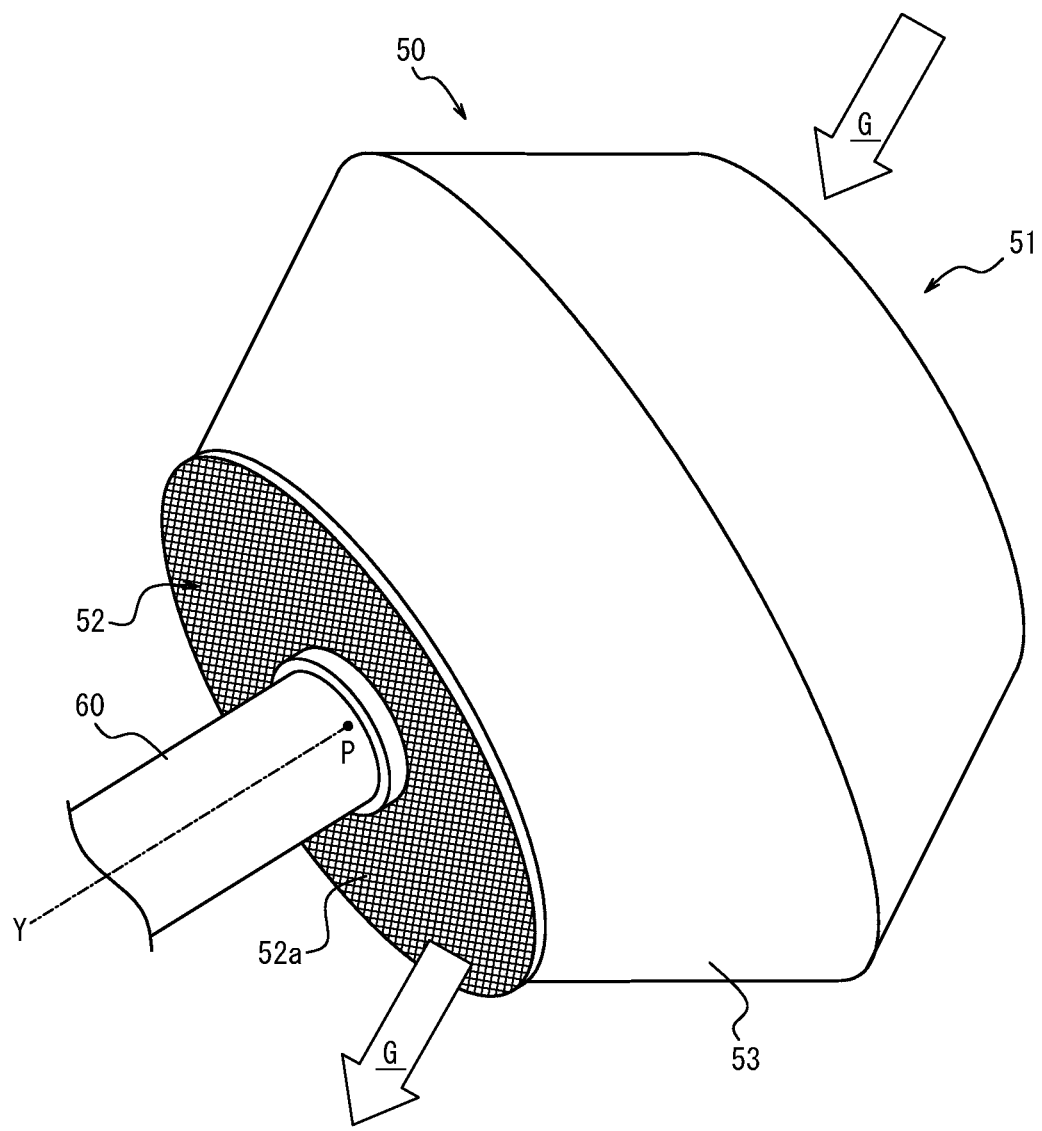
FIG. 6B is a perspective view illustrating schematic configuration of a rotary drum in the rotary drum flow device illustrated in FIG. 6A.
Figure 6C:
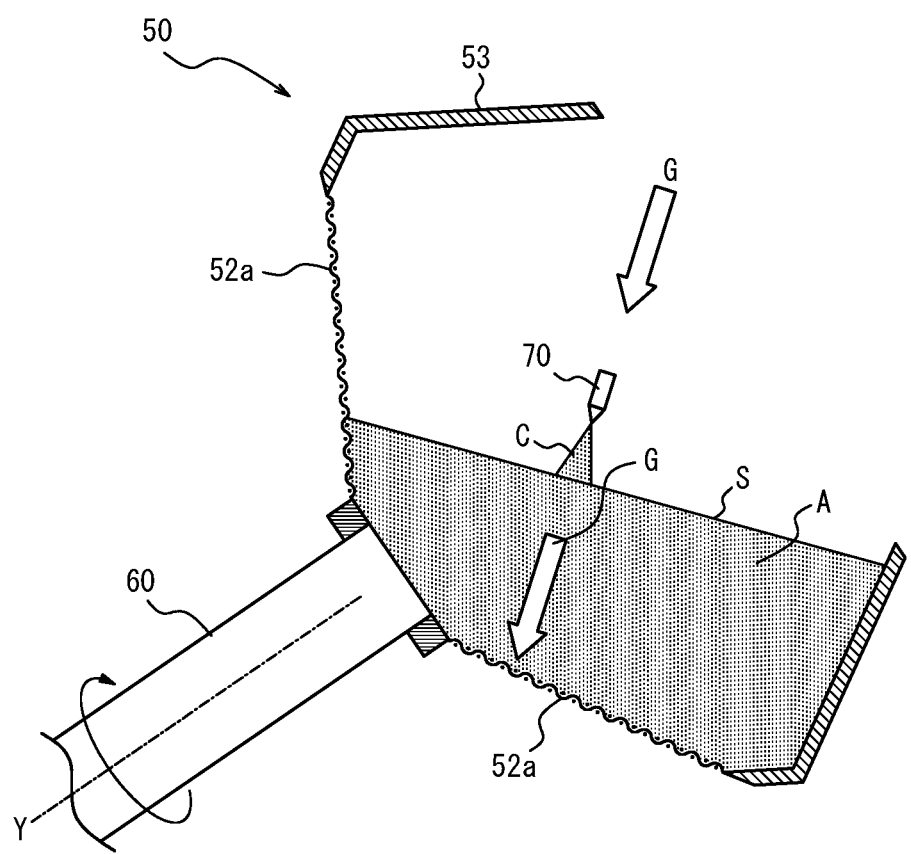
FIG. 6C is a schematic cross-sectional view illustrating schematic configuration of a modified example of the rotary drum in the rotary drum flow device illustrated in FIG. 6A.

FIG. 6A is a schematic cross-sectional view in a direction along a central axis Y that illustrates schematic configuration of one example of a rotary drum flow device that is used in the second embodiment of the presently disclosed method of producing a catalyst-bearing support, FIG. 6B is a perspective view illustrating schematic configuration of a rotary drum in the rotary drum flow device illustrated in FIG. 6A, and FIG. 6C is a schematic cross-sectional view in a direction along the central axis Y that illustrates schematic configuration of a modified example of the rotary drum in the rotary drum flow device illustrated in FIG. 6A.

The second embodiment differs from the first embodiment mainly in terms of the angle of a rotation axle of the rotary drum. The rotary drum flow device 200 includes a housing 80, a rotary drum 50 that is housed inside of the housing 80 such as to be rotatable around a central axis Y that is in a specific direction, a rotation drive mechanism 60 that rotationally drives the rotary drum 50 around the central axis Y, a spraying device 70 that serves as a spraying section for spraying a catalyst solution C against a particulate support A housed inside of the rotary drum 50, and a drying gas supplying device (not illustrated) for supplying a drying gas G into the housing 80. In the present embodiment, the "specific direction" is a direction forming an angle of more than 20° and less than 90° relative to a horizontal direction, preferably a direction forming an angle of more than 20° and not more than 70° relative to a horizontal direction, and more preferably a direction forming an angle of not less than 30° and not more than 45° relative to a horizontal direction.

The rotary drum 50 rotates around the central axis Y (line passing through the center (not illustrated) of a front end section 51 and the center P of a rear end section 52) that forms a specific angle relative to a horizontal direction. As a result of the rotary drum 50 rotating around the central axis Y that forms a specific angle relative to a horizontal direction in this manner, it is possible to efficiently stir the particulate support A housed inside of the rotary drum 50 and also to increase the spraying area of the catalyst solution C and the contacting area of the drying gas G. Moreover, it is possible to increase the filling ratio of the particulate support A in the rotary drum 50.

The rotary drum 50 includes a perimeter wall 53 having a specific shape (refer to FIGS. 6A and 6B), a front end section 51 disposed at a front side of the perimeter wall 53 in a direction of the central axis Y, and a rear end section 52 disposed at a rear side of the perimeter wall 53 in the direction of the central axis Y. Note that the front side in the central axis Y direction is a side that is located further upstream in a spraying direction than an intersection point obtained when the spraying direction is caused to cross the central axis Y. Moreover, the rear side in the central axis Y direction is the opposite side to the front side.

More specifically, in the illustrated configuration, a side corresponding to a front end opening 51a that is provided for supply of the particulate support A into the rotary drum 50 and discharge of the particulate support A or a catalyst-bearing support from the rotary drum 50 is taken to be the front side, whereas an axle side at which the rotation drive mechanism 60 is provided, which is the opposite side to the front side, is taken to be the rear side.

A gas supply port 80a for supplying the drying gas G to inside of the housing 80 and a gas discharge port 80b for discharging, from inside of the housing 80, drying gas G that has been supplied to inside of the housing 80 are provided in the housing 80. In addition, a gap 80c that is disposed at a peripheral side of the rotary drum 50 and that connects the gas supply port 80a and the gas discharge port 80b is provided in the housing 80.

Ventilating sections that each connect the inside and the outside of the rotary drum 50 are provided in the front end section 51 that continues from the front end of the perimeter wall 53 and the rear end section 52 that continues from the rear end of the perimeter wall 53. The front end opening 51a functions as a ventilating section (inflow port for causing drying gas G to flow to inside of rotary drum 50) at the front end section 51, whereas a mesh opening 52a having a mesh form with a plurality of holes formed therein functions as a ventilating section (discharge port for discharging drying gas G from inside of rotary drum 50) at the rear end section 52.

The following describes operation of the rotary drum flow device 200.

First, a particulate support A is loaded into the rotary drum 50 from the front end opening 51a provided in the front end section 51 of the rotary drum 50. Next, the rotary drum 50 that has been loaded with the particulate support A is rotated around the central axis Y that is in the specific direction as a center through operation of the rotation drive mechanism 60. In accompaniment to this rotation of the rotary drum 50, the particulate support A that is housed inside of the rotary drum 50 is swept upward in the direction of gravity (vertical direction) and subsequently flows downward in the direction of gravity (vertical direction) through the gravitational effect of its own weight, which thereby enables efficient upward and downward flow of the particulate support A in the direction of gravity (vertical direction) and also enables efficient stirring of the particulate support A.

Moreover, by using the rotary drum 50, it is possible to increase the spraying area of the catalyst solution C by the spraying device 70 and the contacting area of the drying gas G (area of surface S of layer formed by particulate support A in FIG. 6A) and also to increase the filling ratio of the particulate support A.

Next, the rotary drum 50 is rotated as described above while spraying a catalyst solution C against the particulate support A from the spraying device 70 serving as a spraying section. This enables uniform attachment of the catalyst solution C to the surface of the particulate support A.

In addition, a drying gas G is caused to pass the gas supply port 80a, the front end opening 51a, the particulate support A housed inside of the rotary drum 50, the mesh opening 52a, and the gas discharge port 80b in order. As a result, the surface of the particulate support A to which the catalyst solution C has attached is dried, and a particulate support A having a catalyst coating film formed thereon is obtained.

Modified Examples

A baffle may be provided on the inner wall surface of the perimeter wall 23a or 53 of the rotary drum 20 or 50 in the rotary drum flow device 100 or 200 used in the presently disclosed method of producing a catalyst-bearing support. In a case in which a baffle is installed on the inner wall surface of the perimeter wall 23a or 53 of the rotary drum 20 or 50, the baffle is preferably installed in a spiral shape toward the central axis direction of the rotary drum 20 or 50, and is preferably not in proximity to the spraying device 40 or 70 serving as a spraying section. By providing a baffle on the inner wall surface of the perimeter wall 23a or 53 of the rotary drum 20 or 50, it is possible to cause the particulate support A to move toward the rear side (axle side) of the rotary drum 20 or 50 and thereby inhibit leakage of the particulate support A from the front end opening 23d or 51a provided in the front end section 23b or 51 while also obtaining a sufficient stirring effect.

The shape of the rotary drum 20 or 50 in the rotary drum flow device 100 or 200 that is used in the presently disclosed method of producing a catalyst-bearing support is not specifically limited and may be a polygonal (polygonal prism) shape or a circular tube (cylindrical) shape, for example, but is preferably a polygonal (polygonal prism) shape. Through the rotary drum 20 or 50 having a polygonal (polygonal prism) shape, the particulate support can be efficiently stirred, and stirring performance for particles having a low angle of repose, in particular, is high.

Note that the terms "polygonal (polygonal prism) shape" and "circular tube (cylindrical) shape" are also inclusive of shapes having a protruding section (for example, refer to FIGS. 6A to 6C) or a depressed section (narrowed section) at a side surface thereof. The inclusion of a protruding section is preferable in terms of the rotary drum having larger capacity.

The size of openings (maximum length of one hole) in the mesh formed at the perimeter wall 23a or mesh opening 52a of the rotary drum 20 or 50 that is used in the presently disclosed method of producing a catalyst-bearing support is not specifically limited but is preferably 80% or less, and more preferably 70% or less of the average particle diameter (average diameter) of the particulate support A, and is preferably 20% or more of the average particle diameter (average diameter) of the particulate support A. The particulate support A can be inhibited from falling out from the rotary drum 20 or 50 when the opening size of the mesh is 80% or less of the average particle diameter (average diameter) of the particulate support A, whereas pressure loss of the perimeter wall 23a or mesh opening 52a can be reduced and the particulate support A that has been sprayed with the catalyst solution C can be more efficiently dried when the opening size of the mesh is 20% or more of the average particle diameter (average diameter) of the particulate support A.

In the case of the rotary drum 20 in the rotary drum flow device 100 that is used in the first embodiment of the presently disclosed method of producing a catalyst-bearing support, the ventilating section that connects the inside and the outside of the rotary drum 20 is formed across substantially the entire surface of the perimeter wall 23a. However, ventilating sections may be provided at a plurality of locations in part of the perimeter wall 23a, and, in this case, the ventilating sections are preferably at positions opposite one another via the central axis X. The number of ventilating sections is preferably an even number. Note that in a case in which ventilating sections are provided at a plurality of locations in part of the perimeter wall 23a, the drying gas G passes the gas supply port 30a, a ventilating section (inflow port 23ab), the particulate support A housed inside of the rotary drum 20, a ventilating section (discharge port 23ac), and the gas discharge port 30b in order when ventilating sections are located opposite the gas supply port 30a and/or the gas discharge port 30b. Also note that in a case in which ventilating sections are provided at a plurality of locations in part of the perimeter wall 23a, it is preferable that a plurality of partitioning plates 24 are arranged at specific intervals in a perimeter direction at the periphery of the perimeter wall 23a of the rotary drum 20 and that the open area of the gas discharge port 30b is designed to be smaller than the area of the surface S of the layer formed by the particulate support A inside of the rotary drum 20 in the same manner as for a case in which a ventilating section is provided across the entire surface of the perimeter wall 23a. This makes it possible to inhibit the drying gas G from passing through the gap 30c without coming into contact with the particulate support A and to cause substantially all of the drying gas G that has been supplied to the gas supply port 30a to pass the gas supply port 30a, a ventilating section (inflow port 23ab), the particulate support A housed inside of the rotary drum 20, a ventilating section (discharge port 23ac), and the gas discharge port 30b in order.

In the rotary drum 50 of the rotary drum flow device 200 that is used in the second embodiment of the presently disclosed method of producing a catalyst-bearing support, the rotary drum 50 is an open system without anything provided at the front end opening 51a thereof, but this is not a limitation, and the entire surface or part of the front end opening 51a may have a mesh form. Note that in a case in which the entire surface of the front end opening 51a has a mesh form, it is preferable that the mesh is installed in a detachable manner, for example, in order to enable supply of the particulate support A to inside of the rotary drum 50 and discharge of the particulate support A or a produced catalyst-bearing support from inside of the rotary drum 50 via the front end opening 51a.

Although a mesh opening 52a is provided across the entire surface of the rear end section 52 in the rotary drum 50 of the rotary drum flow device 200 that is used in the second embodiment of the presently disclosed method of producing a catalyst-bearing support, this is not a limitation, and a mesh opening 52a may be provided in part of the rear end section 52.

Although the front end opening 51a and the mesh opening 52a are provided across the entire surface of the front end section 51 and the rear end section 52, respectively, of the rotary drum 50 in the rotary drum flow device 200 that is used in the second embodiment of the presently disclosed method of producing a catalyst-bearing support, this is not a limitation, and these openings may be provided in part of the front end section 51 and/or rear end section 52.

In a case in which the front end opening 51a and the mesh opening 52a are provided at a plurality of locations in part of the front end section 51 and the rear end section 52, respectively, the front end opening 51a and the mesh opening 52a are preferably positioned opposite each other via the central axis Y, the front end opening 51a is preferably positioned above the particulate support A in the direction of gravity (vertical direction), and the mesh opening 52a is preferably positioned below the particulate support A in the direction of gravity (vertical direction).

Although the mesh opening 52a is formed along a roughly perpendicular direction to the central axis Y of the rotary drum 50 in the rotary drum flow device 200 that is used in the second embodiment of the presently disclosed method of producing a catalyst-bearing support, this is not a limitation, and the mesh opening 52a may be formed along a direction that forms a specific angle with a perpendicular direction to the central axis Y of the rotary drum 50 as illustrated in FIG. 6C, for example.

In the rotary drum 50 of the rotary drum flow device 200 that is used in the second embodiment of the presently disclosed method of producing a catalyst-bearing support, a plurality of partitioning plates (not illustrated) may be arranged at specific intervals in the perimeter direction at the periphery of the perimeter wall 53. By providing a plurality of partitioning plates (not illustrated) at specific intervals in the perimeter direction at the periphery of the perimeter wall 53, it is possible to inhibit the drying gas G from passing through the gap 80c and to cause substantially all of the drying gas G that has been supplied to the gas supply port 80a to pass the gas supply port 80a, the front end opening 51a, the particulate support A housed inside of the rotary drum 50, the mesh opening 52a, and the gas discharge port 80b in order.

(Method of Producing Fibrous Carbon Nanostructure)

The presently disclosed fibrous carbon nanostructure production method is a method of producing a fibrous carbon nanostructure. The presently disclosed method of producing a fibrous carbon nanostructure includes a step of supplying a source gas to a catalyst-bearing support obtained by the presently disclosed method of producing a catalyst-bearing support, and synthesizing a fibrous carbon nanostructure on a catalyst layer (synthesis step).

<Fibrous Carbon Nanostructure>

The fibrous carbon nanostructure is not specifically limited and may, for example, be a fibrous carbon nanostructure having an aspect ratio of more than 10. Specifically, the fibrous carbon nanostructure may be a CNT, vapor-grown carbon fiber, or the like.

Note that the "aspect ratio of a fibrous carbon nanostructure" referred to in the present disclosure can be determined by measuring the diameters (outer diameters) and lengths of 100 randomly selected fibrous carbon nanostructures using a transmission electron microscope.

Although the following describes a case in which fibrous carbon nanostructures including CNTs are obtained by the presently disclosed production method, this is not a limitation on the presently disclosed method.

<<Carbon Nanotubes>>

CNTs are a material that have a structure in which a graphene sheet is rolled up in a tube shape and that have a one-dimensional structure having an extremely large aspect ratio (refer to NPL 1). The fibrous carbon nanostructures including CNTs may be composed of just CNTs or may be a mixture of CNTs and fibrous carbon nanostructures other than CNTs.

Although the CNTs may be single-walled carbon nanotubes and/or multi-walled carbon nanotubes without any specific limitations, CNTs having 10 or fewer walls are preferable from a viewpoint of increasing various characteristics such as mechanical strength, electrical characteristics, and thermal conductivity, CNTs having 5 or fewer walls are more preferable, and single-walled carbon nanotubes are even more preferable. The single-walled carbon nanotubes/multi-walled carbon nanotubes can be adjusted as appropriate by altering various reaction conditions such as the size of the catalyst, the composition of the catalyst, the reaction time, and the supply flow rate of the source gas, for example.

[Properties]

The average diameter of the fibrous carbon nanostructures including CNTs can be set as a desired value in accordance with various applications. For example, the average diameter of the CNTs or the like can be adjusted to approximately 1 nm by using fine metal particles having a particle diameter of approximately not less than 1 nm and not more than 2 nm as a catalyst produced through reduction of the previously described catalyst layer, whereas the average diameter of the CNTs or the like can be adjusted to approximately not less than 20 nm and not more than 30 nm by using fine metal particles having a particle diameter of approximately 30 nm, for example. In general, various characteristics of CNTs tend to improve when the CNTs have a finer average diameter.

Note that the "average diameter" of the fibrous carbon nanostructures including CNTs can be determined by measuring the diameters (external diameters) of 100 randomly selected fibrous carbon nanostructures using a transmission electron microscope, for example.

The average length of the fibrous carbon nanostructures including CNTs can be set as a desired value in accordance with various applications, but the average length at time of synthesis is preferably 1 μm or more, and more preferably 50 μm or more. This is because when the average length of the fibrous carbon nanostructures including CNTs at the time of synthesis is 1 or more, the obtained fibrous carbon nanostructures can be caused to better display various character-istics such as mechanical strength, electrical characteristics, and thermal conductivity. Moreover, the average length of the fibrous carbon nanostructures including CNTs at the time of synthesis is preferably 5,000 μm or less because the fibrous carbon nanostructures become more susceptible to damage such as fracturing or severing with increasing length of the fibrous carbon nanostructures including CNTs at the time of synthesis.

Note that the "average length" of the fibrous carbon nanostructures including CNTs can be adjusted as appropriate by altering the synthesis reaction time, for example.

<Synthesis Step>

In the presently disclosed method of producing a fibrous carbon nanostructure, a source gas is supplied to a catalyst-bearing support obtained by the presently disclosed method of producing a catalyst-bearing support, and a fibrous carbon nanostructure is synthesized on the catalyst layer. For example, by supplying a source gas to a catalyst layer at an outermost layer of a catalyst-bearing support that has been obtained by the presently disclosed method of producing a catalyst-bearing support, producing a fibrous carbon nanostructure on the catalyst layer, and growing the produced fibrous carbon nanostructure by chemical vapor deposition, it is possible to synthesize and grow a fibrous carbon nanostructure such as a carbon nanotube with high efficiency and achieve excellent mass productivity. Note that the catalyst-bearing support is normally subjected to reducing treatment before being used in the method of producing a fibrous carbon nanostructure.

At least one of the catalyst layer and the source gas is normally heated in the synthesis step. However, from a viewpoint of growing fibrous carbon nanostructures with uniform density, it is preferable that at least the source gas is heated. The heating temperature is preferably not lower than 400° C. and not higher than 1100° C. The synthesis step is performed by introducing the source gas and optionally an inert gas, reducing gas, and/or catalyst activating material into a fibrous carbon nanostructure growth furnace that houses the catalyst-bearing support.

From a viewpoint of increasing fibrous carbon nanostructure production efficiency, it is preferable that a reducing gas and the source gas are supplied to the catalyst in the catalyst layer through a gas shower.

—Source Gas—

The source gas is a carbon source-containing material that is a gas at the temperature of fibrous carbon nanostructure growth. Of such materials, hydrocarbons such as methane, ethane, ethylene, propane, butane, pentane, hexane, heptane, propylene, and acetylene are suitable. Other examples include low-carbon number oxygen-containing compounds such as acetone, carbon monoxide, and lower alcohols such as methanol and ethanol. Mixtures of any of the above examples can also be used.

—Inert Gas—

The source gas may be diluted with an inert gas. The inert gas should be a gas that is inert at the temperature of fibrous carbon nanostructure growth and does not react with the grown fibrous carbon nanostructure, and is preferably a gas that does not reduce the activity of the catalyst. Examples of inert gases that can be used include noble gases such as helium, argon, neon, and krypton; nitrogen; hydrogen; and mixed gases of any of these gases.

—Reducing Gas—

Hydrogen gas, ammonia, water vapor, or a mixed gas of any thereof, for example, can be used as a reducing gas. Furthermore, the reducing gas may be a mixed gas obtained by mixing hydrogen gas with an inert gas such as helium gas, argon gas, or nitrogen gas.

—Catalyst Activating Material—

A catalyst activating material may be added in the fibrous carbon nanostructure synthesis step. The addition of a catalyst activating material can further improve fibrous carbon nanostructure production efficiency and purity. The catalyst activating material that is used is typically an oxygen-containing material and is preferably a material that does not impart significant damage to the fibrous carbon nanostructure at the temperature of fibrous carbon nanostructure growth. Examples of effective catalyst activating materials include low-carbon number oxygen-containing compounds such as water, oxygen, ozone, acid gas, nitrogen oxide, carbon monoxide, and carbon dioxide; alcohols such as ethanol and methanol; ethers such as tetrahydrofuran; ketones such as acetone; aldehydes; esters; and mixtures thereof. Of these examples, water, oxygen, carbon dioxide, carbon monoxide, and ethers are preferable, and water is particularly suitable.

Although no specific limitations are placed on the volume concentration of the catalyst activating material, a trace amount is preferable. For example, in the case of water, the volume concentration thereof in gas that is introduced into the furnace is normally not less than 10 ppm and not more than 10,000 ppm, and preferably not less than 50 ppm and not more than 1,000 ppm.

—Other Conditions—

The pressure inside of the reaction furnace during the synthesis step and the treatment time may be set as appropriate in view of other conditions. For example, the pressure can be set as approximately not less than $1\times10^2$ Pa and not more than $1\times10^7$ Pa and the treatment time can be set as approximately not less than 1 minute and not more than 60 minutes.

EXAMPLES

The following describes examples of the present disclosure. However, the present disclosure is not in any way limited by these examples.

Example 1

<Production of Catalyst-Bearing Support>

A catalyst-bearing support was produced in the same way as in the configuration illustrated in FIG. 3. The rotary drum 20 of the rotary drum flow device 100 described in the first embodiment was loaded with 750 g of zirconia (zirconium dioxide) beads ($ZrO_2$; volume-average particle diameter D50: 300 μm) as a metal oxide. These zirconia beads (particulate support A) were stirred (rotation speed of rotary drum 20: 20 rpm; rotation around central axis X with central axis X as horizontal direction) while, in order to form a foundation layer, spraying (spraying rate: 3 g/min; spraying time: 940 s; spraying air pressure: 10 MPa) an aluminum-containing solution by a spray gun (spraying device 40) and performing drying by supplying compressed air (0.5 MPa) to inside of the rotary drum 20 as a drying gas G at 300 L/min and discharging the compressed air from inside of the rotary drum 20 so as to form a coating film formed of the aluminum-containing solution on the zirconia beads. Next, 45 minutes of firing treatment was performed at 480° C. to obtain a foundation layer-equipped particulate support having an aluminum oxide layer formed as a foundation layer. Note that the angle formed by the arrangement direction I of the spray gun (spraying device 40), which was the spraying direction of the aluminum-containing solution, and the inflow direction H of the drying gas G inside of the rotary drum 20 was 0°.

Next, the foundation layer-equipped particulate support that had been obtained was stirred (rotation speed of rotary drum 20: 20 rpm; rotation around central axis X with central axis X as horizontal direction) while spraying (spraying rate: 2 g/min; spraying time: 480 s; spraying air pressure: 5 MPa) an iron catalyst solution (catalyst solution C) by the spray gun (spraying device 40) and performing drying by supplying compressed air (0.5 MPa) to inside of the rotary drum 20 as a drying gas G at 300 L/min and discharging the compressed air from inside of the rotary drum 20 so as to form a coating film formed of the iron catalyst solution (catalyst solution C) on the foundation layer-equipped particulate support. Next, 20 minutes of firing treatment was performed at 220° C. to obtain a catalyst-bearing support having an iron oxide layer further formed as a catalyst layer.

<Synthesis of Carbon Nanotubes>

In a reaction tube, a source gas containing ethylene gas ($C_2H_4$) was supplied to the catalyst-bearing support obtained as described above at a total flow rate of 1,500 sccm for 10 minutes in an environment of normal pressure and 850° C. in temperature. By supplying the source gas in this manner, carbon nanotubes were synthesized on the catalyst-bearing support by a fluidized bed method in which the catalyst-bearing support was fluidized.

The catalyst-bearing support on which carbon nanotubes had been synthesized was used to calculate the production yield of carbon nanotubes by the method described below. As a result, the production yield of carbon nanotubes was determined to be 4.4%.

<<Production Yield Y of Carbon Nanotubes>>

The weight $G_{c\text{-}source}$ (g) of a carbon source contained in ethylene supplied to the reaction site was calculated by the following formula (I) using the total supply flow rate F (sccm) of the source gas, the ethylene concentration $C_{C2H4}$ (volume %), the reaction time t (min), the molar volume V of a gas in a standard state (=22,400 cc/mol), and the molar mass M of carbon 12 g/mol).

$$G_{c\text{-}source}\text{ (g)}=F\times(C_{C2H4}/100)\times t\times(1/V)\times(M\times 2) \quad\quad (I)$$

Next, the absolute yield $G_{CNT}$ (g) of carbon nanotubes synthesized on the catalyst of the catalyst-bearing support was weighed using an electronic balance. Note that $G_{CNT}$ was determined by subtracting the mass of the catalyst-bearing support from the mass of the overall catalyst-bearing support with the carbon nanotubes synthesized thereon. The production yield Y (%) of carbon nanotubes was then calculated by the following formula (II).

$$\text{Carbon nanotube production yield }Y\text{ (\%)}=(G_{CNT}/G_{c\text{-}source})\times 100 \quad\quad (II)$$

A higher value for the production yield Y indicates higher carbon nanotube production efficiency.

Example 2

Carbon nanotubes were synthesized and the production yield of carbon nanotubes was calculated in the same way as in Example 1 with the exception that, in Example 1, production of a catalyst-bearing support was performed as described below. As a result, the production yield of carbon nanotubes was determined to be 4.1%.

<Production of Catalyst-Bearing Support>

The inside of the rotary drum 50 of the rotary drum flow device 200 described in the second embodiment was loaded with 3,000 g of zirconia (zirconium dioxide) beads (ZrO$_2$; volume-average particle diameter D50: 300 μm) as a metal oxide. These zirconia beads (particulate support A) were stirred (rotation speed of rotary drum 50: 15 rpm; rotation around central axis Y with central axis Y as line forming angle of 30° with horizontal direction) while spraying (spraying rate: 5 g/min; spraying time: 2,250 s; spraying air pressure: 10 MPa) an aluminum solution by a spray gun (spraying device 70). Moreover, while performing this spraying, drying was also performed by supplying compressed air (0.5 MPa) to inside of the rotary drum 50 as a drying gas G at 500 L/min and discharging the compressed air from inside of the rotary drum 50 so as to form a coating film formed of the aluminum-containing solution on the zirconia beads. Next, 45 minutes of firing treatment was performed at 480° C. to obtain a foundation layer-equipped particulate support having an aluminum oxide layer formed as a foundation layer. Note that the angle formed by the arrangement direction I of the spray gun (spraying device 70), which was the spraying direction of the aluminum-containing solution, and the inflow direction H of the drying gas G inside of the rotary drum 50 was 0°.

In addition, the foundation layer-equipped particulate support that had been obtained was stirred (rotation speed of rotary drum 50: 15 rpm; rotation around central axis Y with central axis Y as line forming angle of 45° with horizontal direction) while spraying (spraying rate: 4 g/min; spraying time: 960 s; spraying air pressure: 10 MPa) an iron catalyst solution (catalyst solution C) by the spray gun (spraying device 70) and performing drying by supplying compressed air (0.5 MPa) to inside of the rotary drum 50 as a drying gas G at 600 L/min and discharging the compressed air from inside of the rotary drum 50 so as to form a coating film formed of the iron catalyst solution (catalyst solution C) on the foundation layer-equipped particulate support. Next, 20 minutes of firing treatment was performed at 220° C. to obtain a catalyst-bearing support having an iron oxide layer further formed as a catalyst layer.

Comparative Example 1

Carbon nanotubes were synthesized and the production yield of carbon nanotubes was calculated in the same way as in Example 1 with the exception that, in Example 1, production of a catalyst-bearing support was performed as described below. As a result, the production yield of carbon nanotubes was determined to be 2%.

<Production of Catalyst-Bearing Support>

A coating film formed of an aluminum-containing solution was formed on zirconia (zirconium dioxide) beads (ZrO$_2$; volume-average particle diameter D50: 320 μm) serving as a metal oxide by immersing (immersion time: 20 s) 150 g of the zirconia beads in the aluminum-containing solution and performing drying by supplying air (temperature: 45° C.) at 50 L/min for 1,000 s. Next, 30 minutes of firing treatment was performed at 480° C. so as to obtain a foundation layer-equipped particulate support having an aluminum oxide layer formed as a foundation layer.

In addition, the foundation layer-equipped particulate support that had been obtained was immersed (immersion time: 20 s) in an iron catalyst solution and was dried by supplying air (temperature: 45° C.) at 50 L/min for 1,000 s so as to form a coating film formed of the iron catalyst solution on the foundation layer-equipped particulate support. Next, 20 minutes of firing treatment was performed at 220° C. to obtain a catalyst-bearing support having an iron oxide layer further formed as a catalyst layer.

The production efficiency of carbon nanotubes was high in Examples 1 and 2 compared to in Comparative Example 1. This demonstrates that a catalyst layer could be more uniformly formed on the surface of a particulate support in Examples 1 and 2 than in Comparative Example 1.

INDUSTRIAL APPLICABILITY

According to the present disclosure, it is possible to provide a method of producing a catalyst-bearing support that enables uniform formation of a catalyst layer on the surface of a particulate support.

Moreover, according to the present disclosure, it is possible to provide a method of producing a fibrous carbon nanostructure that enables high-efficiency synthesis of a fibrous carbon nanostructure such as a carbon nanotube and excels in terms of mass productivity.

REFERENCE SIGNS LIST

1 particulate support
2 coating film
3 coating film-equipped particulate support
4 foundation layer
5 foundation layer-equipped particulate support
6 coating film
7 catalyst coating film-equipped particulate support
10 iron oxide layer
11 catalyst-bearing support
12 coating film
13 coating film-equipped particulate support
14 catalyst layer
15 catalyst coating film-equipped particulate support
16 coating film
17 catalyst coating film-equipped particulate support
18 iron oxide layer
19 catalyst-bearing support
20 rotary drum
23 drum body
23a perimeter wall
23ab inflow port
23ac discharge port
23b front end section
23c tapered section
23d front end opening
23e front end ring
23f linking section
23g rotation drive mechanism
23h rear end ring
23i drum section
24 partitioning plate
30 housing
30a gas supply port
30b gas discharge port
30c gap
30d inner surface
40 spraying device
50 rotary drum
51 front end section
51a front end opening
52 rear end section
52a mesh opening
53 perimeter wall
60 rotation drive mechanism
70 spraying device
80 housing
80a gas supply port 80b gas discharge port
80c gap
100 rotary drum flow device
200 rotary drum flow device
A particulate support
C catalyst solution
G drying gas
H inflow direction
I arrangement direction
P center
S surface
X central axis
Y central axis
θ angle

The invention claimed is:

1. A method of producing a catalyst-bearing support that produces a catalyst-bearing support used in production of a fibrous carbon nanostructure, comprising:
a stirring step of rotating an approximately circular tube-shaped rotary drum housing a particulate support inside thereof around a central axis that forms an angle of not less than 0° and less than 90° relative to a horizontal direction so as to stir the particulate support;
a spraying step of spraying a catalyst solution against the particulate support inside of the rotary drum; and
a drying step of causing a drying gas to flow to inside of the rotary drum from outside of the rotary drum and causing contact of the drying gas with the particulate support that has been sprayed with the catalyst solution in the spraying step so as to dry the catalyst solution, wherein
at least part of an implementation period of the stirring step and at least part of an implementation period of the spraying step overlap with each other,
a spraying direction of the catalyst solution and an inflow direction of the drying gas inside of the rotary drum form an angle of not less than 0° and not more than 45°,
the spraying direction of the catalyst solution and the inflow direction of the drying gas each form an angle of not less than 60° and not more than 120° relative to a surface of a layer formed by the particulate support during rotation,
the central axis forms an angle of not less than 0° and not more than 20° relative to a horizontal direction,
in the drying step, an inflow port for causing the drying gas to flow to inside of the rotary drum from outside of the rotary drum and a discharge port for discharging the drying gas to outside of the rotary drum from inside of the rotary drum are formed in a perimeter wall that is a peripheral section of the rotary drum, and
the inflow port and the discharge port are positioned radiate axially and oppositely from the central axis.

2. The method of producing a catalyst-bearing support according to claim 1, wherein at least part of the implementation period of the stirring step, at least part of the implementation period of the spraying step, and at least part of an implementation period of the drying step overlap with one another.

3. The method of producing a catalyst-bearing support according to claim 1, wherein the drying gas flows in while in a temperature adjusted state of not lower than 0° C. and not higher than 200° C. in the drying step.

4. The method of producing a catalyst-bearing support according to claim 1, wherein
either or both of the inflow port and the discharge port are formed in a mesh form, and
the discharge port formed in the mesh form is a structure that allows passage of the drying gas and does not allow passage of the particulate support.

5. The method of producing a catalyst-bearing support according to claim 1, wherein the particulate support is formed of a metal oxide.

6. The method of producing a catalyst-bearing support according to claim 5, wherein the metal oxide is zirconium dioxide, aluminum oxide, or zircon.

7. The method of producing a catalyst-bearing support according to claim 1, wherein the catalyst solution contains one or more metals among Ni, Fe, Co, and Mo.

8. The method of producing a catalyst-bearing support according to claim 1, wherein the particulate support includes either or both of a foundation layer and a catalyst layer on a surface thereof.

9. The method of producing a catalyst-bearing support according to claim 1, further comprising a firing step of firing the particulate support at not lower than 50° C. and not higher than 900° C.

10. A method of producing a fibrous carbon nanostructure comprising a step of supplying a source gas to a catalyst-bearing support obtained by the method of producing a catalyst-bearing support according to claim 1, and synthesizing a fibrous carbon nanostructure on a catalyst layer of the catalyst-bearing support.

* * * * *